(12) United States Patent
Bradley et al.

(10) Patent No.: US 9,451,111 B1
(45) Date of Patent: Sep. 20, 2016

(54) METHOD OF DETERMINING A MEDIA CLASS IN AN IMAGING DEVICE USING AN OPTICAL TRANSLUCENCE SENSOR

(71) Applicant: LEXMARK INTERNATIONAL, INC., Lexington, KY (US)

(72) Inventors: Ryan Thomas Bradley, Lexington, KY (US); James Lee Combs, Lexington, KY (US); Niko Jay Murrell, Lexington, KY (US); Franklin Joseph Palumbo, Nicholasville, KY (US); Daniel Steinberg, Lexington, KY (US); Julie Ann Gordon Whitney, Georgetown, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 14/833,648

(22) Filed: Aug. 24, 2015

(51) Int. Cl.
   *H04N 1/00* (2006.01)
(52) U.S. Cl.
   CPC ...... *H04N 1/00724* (2013.01); *H04N 1/00058* (2013.01); *H04N 1/0075* (2013.01); *H04N 1/00734* (2013.01); *H04N 2201/0094* (2013.01)
(58) Field of Classification Search
   CPC ............... H04N 1/00724; H04N 1/00726; H04N 1/0075

USPC ......................................................... 358/1.15
See application file for complete search history.

(56) References Cited

U.S. PATENT DOCUMENTS

| 2016/0004193 A1* | 1/2016 | Murrell | G03G 15/50 399/67 |
| 2016/0044195 A1* | 2/2016 | Murrell | H04N 1/00724 358/1.1 |

* cited by examiner

*Primary Examiner* — Eric A Rust
(74) *Attorney, Agent, or Firm* — John Victor Pezdek

(57) ABSTRACT

A method of determining a media class using an optical translucence sensor (OTS) in an imaging device. A media sheet for processing by a media processing device (MPD) in the imaging device passes through an OTS positioned on a media path prior to the MPD. The OTS has an output that is periodically sampled in several predefined interest zones to provide a plurality of intrinsic variables related to the media sheet. The intrinsic variables are combined with extrinsic variables to form a variables data set that is normalized then fed to a controller having a predefined set of media class determining equations for determining a media class for the media sheet. A media class determining equation is provided for each class of media expected to be used in the imaging device. The determined media class is then used to set one or more operating parameters for the media processing device.

17 Claims, 14 Drawing Sheets

| Factor | Input Variable | Measure type: Intrinsic Extrinsic | Unit of Measure | Zone | Description |
|---|---|---|---|---|---|
| X1 | Process Speed | E | PPM | N/A | selected process speed: 25, 40, 50, or 70 pages per minute |
| X2 | Temperature | E | degrees C | N/A | temperature |
| X3 | Relative Humidity | E | % | N/A | relative humidty |
| X4 | Moisture | E | grains | N/A | grains moisture calculated by the engine from temperature and relative humidity |
| X5 | Initial Max | I | ADC counts | 1 | maximum value reported by the OTS in interest zone 1 |
| X6 | First Mean | I | ADC counts | 2 | mean calculated from all data collected by the OTS in interest zone 2 |
| X7 | First Min | I | ADC counts | 2 | minimum value reported by the OTS in interest zone 2 |
| X8 | FirstMax | I | ADC counts | 2 | maximum value reported by the OTS in interest zone 2 |
| X9 | First Range | I | ADC counts | 2 | First Max - First Min ; range of values reported by the OTS in interest zone 2 |
| X10 | Second Mean | I | ADC counts | 3 | mean calculated from all data collected by the OTS in interest zone 3 |
| X11 | Second Min | I | ADC counts | 3 | minimum value reported by the OTS in interest zone 3 |
| X12 | Second Max | I | ADC counts | 3 | maximum value reported by the OTS in interest zone 3 |
| X13 | Second Range | I | ADC counts | 3 | Second Max - Second Min ; range of values reported by the OTS in interest zone 3 |
| X14 | First Delta First Mean & Initial Maximun | I | ADC counts | 1 & 2 | Initial Max - First Mean; difference between initial maximum and mean from interest zones 1 & 2 |
| X15 | Third Mean | I | ADC counts | 4 | mean calculated from all data collected by the OTS in interest zone 4 |
| X16 | Third Min | I | ADC counts | 4 | minimum value reported by the OTS in interest zone 4 |
| X17 | Third Max | I | ADC counts | 4 | maximum value reported by the OTS in interest zone 4 |
| X18 | Third Range | I | ADC counts | 4 | Third Max - Third Min ; range of values reported by the OTS in interest zone 4 |
| X19 | Second Delta First Mean Second Mean | I | ADC counts | 2 & 3 | First Mean - Second Mean; difference between the means from the interest zones 2 & 3 |
| X20 | Third Delta First Mean Third Mean | I | ADC counts | 2 & 4 | First Mean - Third Mean; difference between the means from interest zones 3 & 4 |
| X21 | Fourth Delta Second Mean Third Mean | I | ADC counts | 3 & 4 | Second Mean - Third Mean; difference between the means from the interest zones 3 & 4 |
| X22 | Input Source | E | source | N/A | selected input source: 1 = input media tray 1, 2 = manual media feed tray, 3 = other |

Figure 9

| Value | Term | Value | Term | Value | Term | Value | Term | Value | Term |
|---|---|---|---|---|---|---|---|---|---|
| -0.31351 | x1 | -0.61607 | x1*x12 | 0.668023 | x1*x19 | -0.04394 | x7*x18 | -0.85538 | x14*x18 |
| 2.507055 | x2 | 0.144997 | x2*x11 | -0.04971 | x2*x18 | 0.075328 | x8*x17 | 0.13487 | x15*x17 |
| -1.37206 | x3 | 0.383066 | x3*x10 | -0.20656 | x3*x17 | -0.15312 | x9*x16 | 0.074819 | x12*x21 |
| -0.42903 | x4 | -0.00575 | x4*x9 | -0.16425 | x4*x16 | 0.075464 | x10*x15 | -0.03922 | x13*x20 |
| 1.512722 | x5 | -0.17555 | x5*x8 | -0.1757 | x5*x15 | -0.21998 | x11*x14 | -1.93116 | x14*x19 |
| -0.90759 | x6 | 0.245223 | x6*x7 | -1.03963 | x6*x14 | -0.69191 | x12*x13 | -0.26622 | x15*x18 |
| -0.49354 | x7 | -0.18069 | x1*x13 | -0.12127 | x7*x13 | 0.480723 | x5*x21 | 0.183027 | x16*x17 |
| -0.39329 | x8 | 0.176559 | x2*x12 | 0.143545 | x8*x12 | 0.697906 | x6*x20 | -0.5029 | x13*x21 |
| 0.400408 | x9 | 0.262895 | x3*x11 | -0.11605 | x9*x11 | 0.235069 | x7*x19 | -1.90495 | x14*x20 |
| -0.46231 | x10 | -0.09474 | x4*x10 | 0.082287 | x1*x20 | -0.01849 | x8*x18 | -0.40933 | x15*x19 |
| -0.87184 | x11 | -0.35985 | x5*x9 | -1.29226 | x2*x19 | -0.09664 | x9*x17 | -0.23034 | x16*x18 |
| -0.73143 | x12 | 0.272021 | x6*x8 | 0.974773 | x3*x18 | 0.138596 | x10*x16 | 0.038928 | x14*x21 |
| 2.261732 | x13 | 0.623572 | x1*x14 | -0.12712 | x4*x17 | 0.020188 | x11*x15 | -0.41765 | x15*x20 |
| 4.701306 | x14 | -0.07973 | x2*x13 | -0.10608 | x5*x16 | -0.23086 | x12*x14 | -0.42338 | x16*x19 |
| -0.26387 | x15 | 0.301394 | x3*x12 | -0.1714 | x6*x15 | 0.46107 | x6*x21 | -0.18256 | x17*x18 |
| -0.24377 | x16 | -0.21123 | x4*x11 | -0.98092 | x7*x14 | 0.616889 | x7*x20 | 0.007261 | x15*x21 |
| -0.02621 | x17 | 0.094519 | x5*x10 | -0.08447 | x8*x13 | 0.241969 | x8*x19 | -0.40307 | x16*x20 |
| 1.4776 | x18 | -0.07561 | x6*x9 | -0.12629 | x9*x12 | -0.01165 | x9*x18 | -0.40355 | x17*x19 |
| -0.70134 | x19 | 0.355495 | x7*x8 | 0.091514 | x10*x11 | 0.173132 | x10*x17 | 0.034963 | x16*x21 |
| -1.21459 | x20 | -0.06466 | x1*x15 | -0.55524 | x1*x21 | 0.087572 | x11*x16 | -0.38341 | x17*x20 |
| -0.4746 | x21 | 0.568531 | x2*x14 | -2.70147 | x2*x20 | 0.012733 | x12*x15 | 0.354608 | x18*x19 |
| 1.059324 | x1*x2 | 0.134914 | x3*x13 | 0.956418 | x3*x19 | -0.81758 | x13*x14 | 0.036373 | x17*x21 |
| -1.68992 | x1*x3 | -0.16927 | x4*x12 | -0.55838 | x4*x18 | 0.395639 | x7*x21 | 0.459622 | x18*x20 |
| -0.08602 | x1*x4 | -0.03341 | x5*x11 | -0.04739 | x5*x17 | 0.634772 | x8*x20 | 0.137323 | x18*x21 |
| 0.129291 | x2*x3 | 0.078133 | x6*x10 | -0.11455 | x6*x16 | 0.119428 | x9*x19 | 1.322013 | x19*x20 |
| 0.294796 | x1*x5 | 0.206996 | x7*x9 | -0.04809 | x7*x15 | -0.18233 | x10*x18 | 0.799797 | x19*x21 |
| -0.6568 | x2*x4 | -0.01562 | x1*x16 | -0.97052 | x8*x14 | 0.110016 | x11*x17 | 0.910527 | x20*x21 |
| -0.05574 | x1*x6 | 0.970913 | x2*x15 | -0.19866 | x9*x13 | 0.081349 | x12*x16 | 0.357744 | x1^2 |
| -0.0871 | x2*x5 | -2.11071 | x3*x14 | 0.068401 | x10*x12 | -0.18995 | x13*x15 | -2.80973 | x2^2 |
| 1.704583 | x3*x4 | 0.103049 | x4*x13 | -1.38343 | x2*x21 | 0.407746 | x8*x21 | 0.364877 | x3^2 |
| 0.398132 | x1*x7 | -0.0513 | x5*x12 | 2.216671 | x3*x20 | 0.393661 | x9*x20 | 1.978925 | x4^2 |
| -0.4034 | x2*x6 | 0.041397 | x6*x11 | -0.04531 | x4*x19 | -0.00744 | x10*x19 | -0.51039 | x5^2 |
| -0.21063 | x3*x5 | 0.168279 | x7*x10 | -0.44974 | x5*x18 | -0.3897 | x11*x18 | 0.081017 | x6^2 |
| 0.43982 | x1*x8 | 0.219258 | x8*x9 | -0.07152 | x6*x17 | 0.107229 | x12*x17 | 0.157648 | x7^2 |
| -0.28291 | x2*x7 | 0.052826 | x1*x17 | 0.006547 | x7*x16 | -0.15985 | x13*x16 | 0.198652 | x8^2 |
| 0.836272 | x3*x6 | 0.941626 | x2*x16 | -0.02956 | x8*x15 | -0.07968 | x14*x15 | -0.08756 | x9^2 |
| -0.68661 | x4*x5 | -0.26248 | x3*x15 | -0.58968 | x9*x14 | 0.29755 | x9*x21 | 0.0612 | x10^2 |
| -0.01686 | x1*x9 | -1.09786 | x4*x14 | -0.43198 | x10*x13 | 0.035899 | x10*x20 | 0.036921 | x11^2 |
| -0.21525 | x2*x8 | -0.61254 | x5*x13 | 0.037759 | x11*x12 | -0.02095 | x11*x19 | 0.001312 | x12^2 |
| 0.867649 | x3*x7 | 0.0281 | x6*x12 | 1.278382 | x3*x21 | -0.38569 | x12*x18 | -0.23467 | x13^2 |
| -0.14052 | x4*x6 | 0.127362 | x7*x11 | -0.02115 | x4*x20 | -0.1098 | x13*x17 | -0.48536 | x14^2 |
| -0.32348 | x1*x10 | 0.194027 | x8*x10 | -0.71048 | x5*x19 | -0.05372 | x14*x16 | 0.025972 | x15^2 |
| 0.48668 | x2*x9 | -0.39772 | x1*x18 | -0.03458 | x6*x18 | 0.057885 | x10*x21 | 0.074786 | x16^2 |
| 0.904927 | x3*x8 | 1.03624 | x2*x17 | 0.048187 | x7*x17 | 0.072083 | x11*x20 | 0.110908 | x17^2 |
| -0.16606 | x4*x7 | -0.31902 | x3*x16 | 0.029644 | x8*x16 | 0.001871 | x12*x19 | -0.14181 | x18^2 |
| -0.32019 | x5*x6 | -0.12092 | x4*x15 | -0.25844 | x9*x15 | -0.30607 | x13*x18 | 0.260937 | x19^2 |
| -0.62348 | x1*x11 | -1.50069 | x5*x14 | -0.03849 | x10*x14 | -0.02357 | x14*x17 | 1.117484 | x20^2 |
| 0.298554 | x2*x10 | -0.22151 | x6*x13 | -0.6899 | x11*x13 | 0.10179 | x15*x16 | 0.054322 | x21^2 |
| 0.217654 | x3*x9 | 0.119187 | x7*x12 | 0.041141 | x4*x21 | 0.107052 | x11*x21 | -1.29077 | K |
| -0.13915 | x4*x8 | 0.149931 | x8*x11 | -0.25048 | x5*x20 | 0.061551 | x12*x20 |  |  |
| -0.20804 | x5*x7 | -0.086 | x9*x10 | 0.251224 | x6*x19 | 0.486391 | x13*x19 |  |  |

Figure 10

| Value | Term | Value | Term | Value | Term | Value | Term | Value | Term | Value | Term |
|---|---|---|---|---|---|---|---|---|---|---|---|
| -0.5347253 | x1 | 0.5025446 | x1*x12 | -0.4734942 | x1*x19 | 0.0866632 | x7*x18 | 0.46694 | x14*x18 | | |
| -3.518768 | x2 | -0.4786248 | x2*x11 | -0.0353132 | x2*x18 | -0.2554621 | x8*x17 | 0.099005 | x15*x17 | | |
| 1.0354086 | x3 | -0.5001706 | x3*x10 | -0.0253304 | x3*x17 | -0.0451297 | x9*x16 | -0.1115774 | x12*x21 | | |
| 1.2312645 | x4 | 0.4572097 | x4*x9 | 0.7939836 | x4*x16 | 0.0306121 | x10*x15 | 0.0620817 | x13*x20 | | |
| -0.1723424 | x5 | -0.0219797 | x5*x8 | 0.0276302 | x5*x15 | 0.262312 | x11*x14 | 2.4682169 | x14*x19 | | |
| 1.4685478 | x6 | -0.7423997 | x6*x7 | 1.3115312 | x6*x14 | 0.58043 | x12*x13 | -0.1619001 | x15*x18 | | |
| 1.323039 | x7 | 0.0649606 | x1*x13 | 0.183616 | x7*x13 | -0.5467967 | x5*x21 | 0.125866 | x16*x17 | | |
| 1.3270526 | x8 | -0.4615651 | x2*x12 | -0.5503528 | x8*x12 | -1.1521604 | x6*x20 | 0.5204402 | x13*x21 | | |
| -0.0297448 | x9 | -0.4152918 | x3*x11 | 0.1069722 | x9*x11 | -0.6958022 | x7*x19 | 2.3833862 | x14*x20 | | |
| 1.0329805 | x10 | 0.7160661 | x4*x10 | 0.4147917 | x1*x20 | 0.0701385 | x8*x18 | 0.0358772 | x15*x19 | | |
| 1.1171191 | x11 | 0.2302395 | x5*x9 | 0.9887318 | x2*x19 | -0.143812 | x9*x17 | -0.1904793 | x16*x18 | | |
| 1.1087524 | x12 | -0.7045259 | x6*x8 | -0.0562685 | x3*x18 | 0.03508 | x10*x16 | -0.1018103 | x14*x21 | | |
| -1.0543338 | x13 | -0.5216289 | x1*x14 | 0.7238485 | x4*x17 | -0.1787521 | x11*x15 | -0.2690089 | x15*x20 | | |
| -2.9983823 | x14 | 0.2509984 | x2*x13 | 0.0195454 | x5*x16 | 0.264021 | x12*x14 | 0.0296555 | x16*x19 | | |
| 0.8036119 | x15 | -0.4248268 | x3*x12 | 0.0408321 | x6*x15 | -0.4993218 | x6*x21 | -0.3073887 | x17*x18 | | |
| 0.7853242 | x16 | 0.7963076 | x4*x11 | 1.5075412 | x7*x14 | -1.1161744 | x7*x20 | -0.3510698 | x15*x21 | | |
| 0.5092372 | x17 | -0.2229097 | x5*x10 | 0.1547534 | x8*x13 | -0.6760005 | x8*x19 | -0.316162 | x16*x20 | | |
| -0.0286478 | x18 | 0.2681851 | x6*x9 | 0.1173559 | x9*x12 | -0.0710909 | x9*x18 | 0.0203517 | x17*x19 | | |
| 0.8339673 | x19 | -0.8927208 | x7*x8 | -0.2298873 | x10*x11 | -0.0736342 | x10*x17 | -0.3910549 | x16*x21 | | |
| 1.3100619 | x20 | -0.0346605 | x1*x15 | 0.8148391 | x1*x21 | -0.1827022 | x11*x16 | -0.3209248 | x17*x20 | | |
| 0.3891073 | x21 | -0.1526316 | x2*x14 | 2.8023346 | x2*x20 | -0.1519724 | x12*x15 | 0.0522724 | x18*x19 | | |
| -1.4469283 | x1*x2 | 0.2547154 | x3*x13 | -1.5360453 | x3*x19 | 0.2991483 | x13*x14 | -0.3879737 | x17*x21 | | |
| 1.3194647 | x1*x3 | 0.7483693 | x4*x12 | 0.3373439 | x4*x18 | -0.4638369 | x7*x21 | -0.028465 | x18*x20 | | |
| 0.377928 | x1*x4 | -0.3544384 | x5*x11 | -0.1406437 | x5*x17 | -1.1021359 | x8*x20 | -0.1109614 | x18*x21 | | |
| -1.1947061 | x2*x3 | -0.18649 | x6*x10 | 0.0415394 | x6*x16 | 0.2951043 | x9*x19 | -1.4617631 | x19*x20 | | |
| -0.1804629 | x1*x5 | 0.0242249 | x7*x9 | -0.171725 | x7*x15 | -0.2232549 | x10*x18 | -0.8286904 | x19*x21 | | |
| 1.9366332 | x2*x4 | -0.0820679 | x1*x16 | 1.4973978 | x8*x14 | -0.2731402 | x11*x17 | -0.2905653 | x20*x21 | | |
| 0.157613 | x1*x6 | -1.3434551 | x2*x15 | 0.0337505 | x9*x13 | -0.156398 | x12*x16 | 0.6061243 | x1^2 | | |
| -0.0737582 | x2*x5 | 1.7483641 | x3*x14 | -0.1872081 | x10*x12 | -0.0845995 | x13*x15 | 3.6720872 | x2^2 | | |
| -2.8382707 | x3*x4 | -0.3162676 | x4*x13 | 1.7508788 | x2*x21 | -0.4713138 | x8*x21 | -1.3118808 | x3^2 | | |
| -0.0705252 | x1*x7 | -0.3200665 | x5*x12 | -2.6045204 | x3*x20 | 0.1258141 | x9*x20 | -1.697795 | x4^2 | | |
| 0.0850192 | x2*x6 | -0.4248664 | x6*x11 | -0.3343929 | x4*x19 | -0.3746568 | x10*x19 | 0.2744719 | x5^2 | | |
| -0.4132497 | x3*x5 | -0.3819428 | x7*x10 | 0.0240036 | x5*x18 | 0.0898472 | x11*x18 | -0.2736677 | x6^2 | | |
| -0.1067082 | x1*x8 | 0.0585016 | x8*x9 | -0.0705413 | x6*x17 | -0.2526246 | x12*x17 | -0.4588567 | x7^2 | | |
| 0.1341576 | x2*x7 | -0.2413136 | x1*x17 | -0.1713017 | x7*x16 | -0.0961071 | x13*x16 | -0.432726 | x8^2 | | |
| -1.2519354 | x3*x6 | -1.2437925 | x2*x16 | -0.1412848 | x8*x15 | 0.101122 | x14*x15 | 0.2242653 | x9^2 | | |
| 0.8604119 | x4*x5 | 0.0306024 | x3*x15 | -0.0116248 | x9*x14 | -0.2042062 | x9*x21 | 0.0052379 | x10^2 | | |
| -0.166463 | x1*x9 | 0.6493529 | x4*x14 | 0.1828604 | x10*x13 | -0.4121317 | x10*x20 | -0.2451254 | x11^2 | | |
| 0.0872914 | x2*x8 | 0.0752633 | x5*x13 | -0.4277524 | x11*x12 | -0.3686359 | x11*x19 | -0.1831661 | x12^2 | | |
| -1.1638676 | x3*x7 | -0.3889601 | x6*x12 | -1.1123555 | x3*x21 | 0.0816858 | x12*x18 | 0.1224222 | x13^2 | | |
| 0.5669481 | x4*x6 | -0.6241516 | x7*x11 | -0.3676313 | x4*x20 | -0.1972006 | x13*x17 | -0.0562383 | x14^2 | | |
| 0.3825404 | x1*x10 | -0.3550714 | x8*x10 | 0.5301115 | x5*x19 | 0.0821598 | x14*x16 | 0.0924579 | x15^2 | | |
| -0.5661885 | x2*x9 | 0.3115661 | x1*x18 | -0.16958 | x6*x18 | -0.0811193 | x10*x21 | 0.1173133 | x16^2 | | |
| -1.2337774 | x3*x8 | -1.4150565 | x2*x17 | -0.2689335 | x7*x17 | -0.468388 | x11*x20 | 0.0030797 | x17^2 | | |
| 0.6202403 | x4*x7 | 0.0672072 | x3*x16 | -0.1524077 | x8*x16 | -0.3858286 | x12*x19 | -0.0947005 | x18^2 | | |
| 0.0429469 | x5*x6 | 0.7253114 | x4*x15 | 0.1952805 | x9*x15 | 0.1493785 | x13*x18 | -0.3171898 | x19^2 | | |
| 0.4438138 | x1*x11 | 1.1991242 | x5*x14 | 0.0512121 | x10*x14 | -0.0102722 | x14*x17 | -0.8780666 | x20^2 | | |
| -0.4293907 | x2*x10 | -0.0256547 | x6*x13 | 0.5846626 | x11*x13 | 0.2089726 | x15*x16 | 0.2716121 | x21^2 | | |
| -0.6183864 | x3*x9 | -0.5781979 | x7*x12 | -0.0742216 | x4*x21 | -0.1426387 | x11*x21 | -0.109189 | K | | |
| 0.5908904 | x4*x8 | -0.5953634 | x8*x11 | 0.0360831 | x5*x20 | -0.452938 | x12*x20 | | | | |
| -0.0532447 | x5*x7 | 0.0979207 | x9*x10 | -0.6971337 | x6*x19 | -0.4896781 | x13*x19 | | | | |

Figure 11

| | | | | | | | | | | |
|---|---|---|---|---|---|---|---|---|---|---|
| 1.4761343 | x1 | | 0.0585336 | x1*x12 | -0.2812825 | x1*x19 | -0.2487212 | x7*x18 | 0.3396 | x14*x18 |
| 1.566007 | x2 | | -0.2602918 | x2*x11 | 0.270479 | x2*x18 | -0.2375475 | x8*x17 | -0.4856434 | x15*x17 |
| 1.2480825 | x3 | | 0.6827567 | x3*x10 | 0.6984474 | x3*x17 | 0.2756962 | x9*x16 | -0.2230391 | x12*x21 |
| 0.1463263 | x4 | | -0.1056412 | x4*x9 | -0.4026578 | x4*x16 | -0.3816848 | x10*x15 | -0.0403658 | x13*x20 |
| 0.2657739 | x5 | | -0.411318 | x5*x8 | -0.1130784 | x5*x15 | -0.3466091 | x11*x14 | -0.1855512 | x14*x19 |
| 1.5497877 | x6 | | 0.0310789 | x6*x7 | -0.3983793 | x6*x14 | 0.1341094 | x12*x13 | 0.3569222 | x15*x18 |
| 0.6526111 | x7 | | 0.0480581 | x1*x13 | -0.0731313 | x7*x13 | -0.0692802 | x5*x21 | -0.554635 | x16*x17 |
| 0.5721877 | x8 | | -0.2451384 | x2*x12 | -0.2660786 | x8*x12 | 0.4309148 | x6*x20 | 0.0961335 | x13*x21 |
| 0.2013526 | x9 | | 0.6608762 | x3*x11 | -0.1679441 | x9*x11 | 0.6697426 | x7*x19 | 0.1119494 | x14*x20 |
| 1.3057239 | x10 | | -0.2912947 | x4*x10 | -0.2172586 | x1*x20 | -0.2753022 | x8*x18 | 0.8400813 | x15*x19 |
| 1.4734733 | x11 | | 0.0932791 | x5*x9 | -0.1349371 | x2*x19 | 0.3463364 | x9*x17 | 0.3104803 | x16*x18 |
| 1.3788831 | x12 | | -0.0315638 | x6*x8 | -1.0417481 | x3*x18 | -0.442277 | x10*x16 | 0.3067986 | x14*x21 |
| -1.7298405 | x13 | | 0.4497996 | x1*x14 | -0.3379155 | x4*x17 | -0.2455896 | x11*x15 | 1.1751273 | x15*x20 |
| -2.6452983 | x14 | | 0.5979576 | x2*x13 | -0.1589167 | x5*x16 | -0.329836 | x12*x14 | 0.8712066 | x16*x19 |
| 1.0853027 | x15 | | 0.6391732 | x3*x12 | 0.1069889 | x6*x15 | -0.220116 | x6*x21 | 0.4145532 | x17*x18 |
| 1.0967502 | x16 | | -0.3066152 | x4*x11 | -0.7637184 | x7*x14 | 0.4621084 | x7*x20 | 0.3665429 | x15*x21 |
| 1.2415068 | x17 | | -0.182968 | x5*x10 | -0.0846671 | x8*x13 | 0.6413245 | x8*x19 | 1.2214281 | x16*x20 |
| -1.4817388 | x18 | | -0.2705359 | x6*x9 | -0.1292464 | x9*x12 | 0.0542709 | x9*x18 | 0.8658563 | x17*x19 |
| 0.2596005 | x19 | | -0.3867501 | x7*x8 | -0.3815642 | x10*x11 | -0.321836 | x10*x17 | 0.3816872 | x16*x21 |
| 0.7514138 | x20 | | -0.0882063 | x1*x15 | 0.127831 | x1*x21 | -0.298694 | x11*x16 | 1.2113458 | x17*x20 |
| 0.5490415 | x21 | | 0.692702 | x2*x14 | -0.7886372 | x2*x20 | -0.2194117 | x12*x15 | -0.4909444 | x18*x19 |
| 0.7838945 | x1*x2 | | -0.3084363 | x3*x13 | -0.2142786 | x3*x19 | 0.5229489 | x13*x14 | 0.3767576 | x17*x21 |
| 1.0275024 | x1*x3 | | -0.3322975 | x4*x12 | 0.4271674 | x4*x18 | -0.1777915 | x7*x21 | -0.5461704 | x18*x20 |
| -0.5135873 | x1*x4 | | -0.0534304 | x5*x11 | -0.0014347 | x5*x17 | 0.4166365 | x8*x20 | -0.0585364 | x18*x21 |
| 2.2062834 | x2*x3 | | -0.0254578 | x6*x10 | 0.0615958 | x6*x16 | -0.475737 | x9*x19 | -0.3278784 | x19*x20 |
| 0.1480534 | x1*x5 | | -0.7373684 | x7*x9 | -0.2645682 | x7*x15 | 0.3216104 | x10*x18 | 0.0528512 | x19*x21 |
| -1.5233565 | x2*x4 | | -0.0999241 | x1*x16 | -0.7722766 | x8*x14 | -0.1886401 | x11*x17 | -1.1831698 | x20*x21 |
| -0.0915133 | x1*x6 | | 0.0489577 | x2*x15 | 0.2912603 | x9*x13 | -0.2765477 | x12*x16 | -1.7675314 | x1^2 |
| 0.0433662 | x2*x5 | | 1.1332927 | x3*x14 | -0.3512555 | x10*x12 | 0.2402829 | x13*x15 | -2.3200719 | x2^2 |
| -0.4531 | x3*x4 | | -0.4436907 | x4*x13 | -0.620649 | x2*x21 | -0.1943086 | x8*x21 | -0.9005087 | x3^2 |
| -0.5217946 | x1*x7 | | -0.0163663 | x5*x12 | -0.1188999 | x3*x20 | -0.8162439 | x9*x20 | -0.5593797 | x4^2 |
| -0.3229729 | x2*x6 | | 0.1142759 | x6*x11 | -0.3915179 | x4*x19 | 0.8618742 | x10*x19 | 0.1003794 | x5^2 |
| 1.1566844 | x3*x5 | | -0.3752947 | x7*x10 | 0.2684069 | x5*x18 | 0.1407221 | x11*x18 | 0.1936346 | x6^2 |
| -0.5438953 | x1*x8 | | -0.7717071 | x8*x9 | 0.1798816 | x6*x17 | -0.161837 | x12*x17 | -0.1511314 | x7^2 |
| -0.8559005 | x2*x7 | | 0.0533807 | x1*x17 | -0.3071233 | x7*x16 | 0.1588272 | x13*x16 | -0.2371595 | x8^2 |
| 0.584928 | x3*x6 | | -0.0181013 | x2*x16 | -0.3058421 | x8*x15 | -0.4548159 | x14*x15 | -0.0567636 | x9^2 |
| -0.3668311 | x4*x5 | | 0.6521654 | x3*x15 | 0.7164721 | x9*x14 | -0.3299949 | x9*x21 | -0.2621163 | x10^2 |
| -0.1941345 | x1*x9 | | 0.2290025 | x4*x14 | 0.2729841 | x10*x13 | 0.5876566 | x10*x20 | -0.1152095 | x11^2 |
| -0.8518788 | x2*x8 | | 0.4965802 | x5*x13 | -0.2085232 | x11*x12 | 0.8563604 | x11*x19 | -0.0922397 | x12^2 |
| 0.352899 | x3*x7 | | 0.1421867 | x6*x12 | 0.1154175 | x3*x21 | 0.1647211 | x12*x18 | 0.1592989 | x13^2 |
| -0.4844198 | x4*x6 | | -0.2244155 | x7*x11 | -0.124403 | x4*x20 | 0.2462819 | x13*x17 | 0.3468702 | x14^2 |
| -0.0411303 | x1*x10 | | -0.4254045 | x8*x10 | 0.5883104 | x5*x19 | -0.4555658 | x14*x16 | -0.2702628 | x15^2 |
| -0.0011053 | x2*x9 | | 0.1115321 | x1*x18 | 0.0866549 | x6*x18 | -0.2450747 | x10*x21 | -0.3368206 | x16^2 |
| 0.4090068 | x3*x8 | | 0.1157505 | x2*x17 | -0.2070313 | x7*x17 | 0.5947599 | x11*x20 | -0.2134098 | x17^2 |
| -0.6806847 | x4*x7 | | 0.6995314 | x3*x16 | -0.3396208 | x8*x16 | 0.850888 | x12*x19 | 0.2758368 | x18^2 |
| 0.1941933 | x5*x6 | | -0.4019334 | x4*x15 | 0.1110492 | x9*x15 | 0.3323503 | x13*x18 | -0.1894936 | x19^2 |
| 0.1030158 | x1*x11 | | -0.0252786 | x5*x14 | -0.3271981 | x10*x14 | -0.3783878 | x14*x17 | -0.7540519 | x20^2 |
| -0.3144567 | x2*x10 | | 0.2209043 | x6*x13 | 0.104652 | x11*x13 | -0.6088552 | x15*x16 | -0.6203511 | x21^2 |
| -0.2781463 | x3*x9 | | -0.2119695 | x7*x12 | 0.2803294 | x4*x21 | -0.2328544 | x11*x21 | -1.9235055 | K |
| -0.5901435 | x4*x8 | | -0.279085 | x8*x11 | 0.484371 | x5*x20 | 0.5983539 | x12*x20 | | |
| -0.344672 | x5*x7 | | -0.0673564 | x9*x10 | 0.6810329 | x6*x19 | -0.12197 | x13*x19 | | |

Figure 12

| | | | | | | | | | | |
|---|---|---|---|---|---|---|---|---|---|---|
| -0.71412 | x1 | -0.06754 | x1*x12 | 0.3057 | x1*x19 | 0.14981 | x7*x18 | -0.36487 | x14*x18 |
| -0.83091 | x2 | 0.576772 | x2*x11 | -0.12943 | x2*x18 | 0.350852 | x8*x17 | 0.21359 | x15*x17 |
| -0.74917 | x3 | -0.61463 | x3*x10 | -0.47541 | x3*x17 | -0.13963 | x9*x16 | 0.307005 | x12*x21 |
| -0.92427 | x4 | -0.30372 | x4*x9 | -0.18225 | x4*x16 | 0.252272 | x10*x15 | -0.03338 | x13*x20 |
| -0.27026 | x5 | 0.428521 | x5*x8 | 0.056024 | x5*x15 | 0.13294 | x11*x14 | -0.44953 | x14*x19 |
| -1.64403 | x6 | 0.410301 | x6*x7 | -0.1088 | x6*x14 | -0.04689 | x12*x13 | 0.023806 | x15*x18 |
| -0.97966 | x7 | -0.07136 | x1*x13 | -0.06722 | x7*x13 | 0.280391 | x5*x21 | 0.213525 | x16*x17 |
| -0.97599 | x8 | 0.513418 | x2*x12 | 0.639693 | x8*x12 | 0.04334 | x6*x20 | -0.03491 | x13*x21 |
| -0.05478 | x9 | -0.54802 | x3*x11 | 0.17255 | x9*x11 | -0.24889 | x7*x19 | -0.52461 | x14*x20 |
| -1.55368 | x10 | -0.32027 | x4*x10 | -0.19177 | x1*x20 | 0.166813 | x8*x18 | -0.55997 | x15*x19 |
| -1.41264 | x11 | -0.20227 | x5*x9 | 0.505246 | x2*x19 | -0.16818 | x9*x17 | 0.061789 | x16*x18 |
| -1.41627 | x12 | 0.406542 | x6*x8 | 0.06295 | x3*x18 | 0.250629 | x10*x16 | -0.08016 | x14*x21 |
| 1.324906 | x13 | -0.26472 | x1*x14 | -0.21342 | x4*x17 | 0.389354 | x11*x15 | -0.54656 | x15*x20 |
| 2.688832 | x14 | -0.68991 | x2*x13 | 0.052959 | x5*x16 | 0.101222 | x12*x14 | -0.57026 | x16*x19 |
| -1.2113 | x15 | -0.55974 | x3*x12 | -0.04549 | x6*x15 | 0.321427 | x6*x21 | 0.023369 | x17*x18 |
| -1.2269 | x16 | -0.261 | x4*x11 | 0.01019 | x7*x14 | 0.057191 | x7*x20 | 0.011864 | x15*x21 |
| -1.28017 | x17 | 0.178994 | x5*x10 | -0.06565 | x8*x13 | -0.25188 | x8*x19 | -0.56134 | x16*x20 |
| 0.709468 | x18 | 0.01321 | x6*x9 | 0.128442 | x9*x12 | -0.00072 | x9*x18 | -0.57993 | x17*x19 |
| -0.11397 | x19 | 0.86871 | x7*x8 | 0.527148 | x10*x11 | 0.201419 | x10*x17 | 0.007368 | x16*x21 |
| -0.74823 | x20 | 0.141753 | x1*x15 | -0.51923 | x1*x21 | 0.383772 | x11*x16 | -0.57019 | x17*x20 |
| -0.64429 | x21 | -0.87463 | x2*x14 | 0.635965 | x2*x20 | 0.337315 | x12*x15 | -0.01067 | x18*x19 |
| -0.35584 | x1*x2 | -0.11903 | x3*x13 | 0.793923 | x3*x19 | -0.4793 | x13*x14 | 0.008293 | x17*x21 |
| -0.68162 | x1*x3 | -0.2326 | x4*x12 | -0.18449 | x4*x18 | 0.305183 | x7*x21 | 0.02479 | x18*x20 |
| 0.202207 | x1*x4 | 0.327286 | x5*x11 | -0.0178 | x5*x17 | 0.069786 | x8*x20 | 0.037194 | x18*x21 |
| -1.12211 | x2*x3 | 0.096685 | x6*x10 | -0.05205 | x6*x16 | -0.0367 | x9*x19 | 0.56682 | x19*x20 |
| -0.12087 | x1*x5 | 0.479081 | x7*x9 | 0.417603 | x7*x15 | 0.039332 | x10*x18 | 0.011658 | x19*x21 |
| 0.26426 | x2*x4 | 0.169653 | x1*x16 | 0.002588 | x8*x14 | 0.339344 | x11*x17 | 0.620486 | x20*x21 |
| -0.00925 | x1*x6 | 0.364861 | x2*x15 | -0.17757 | x9*x13 | 0.335485 | x12*x16 | 0.937675 | x1^2 |
| 0.249768 | x2*x5 | -0.67261 | x3*x14 | 0.472831 | x10*x12 | -0.04791 | x13*x15 | 1.397543 | x2^2 |
| 1.566211 | x3*x4 | 0.643937 | x4*x13 | 0.133804 | x2*x21 | 0.320813 | x8*x21 | 1.865576 | x3^2 |
| 0.237795 | x1*x7 | 0.25388 | x5*x12 | 0.428586 | x3*x20 | 0.275827 | x9*x20 | 0.258983 | x4^2 |
| 0.658983 | x2*x6 | 0.242149 | x6*x11 | 0.775121 | x4*x19 | -0.55546 | x10*x19 | -0.1096 | x5^2 |
| -0.53241 | x3*x5 | 0.552156 | x7*x10 | -0.1417 | x5*x18 | 0.126966 | x11*x18 | -0.03 | x6^2 |
| 0.251872 | x1*x8 | 0.465916 | x8*x9 | -0.1064 | x6*x17 | 0.288616 | x12*x17 | 0.424659 | x7^2 |
| 1.039689 | x2*x7 | 0.102209 | x1*x17 | 0.410129 | x7*x16 | 0.024118 | x13*x16 | 0.443625 | x8^2 |
| -0.21666 | x3*x6 | 0.370929 | x2*x16 | 0.40856 | x8*x15 | 0.164105 | x14*x15 | -0.08902 | x9^2 |
| 0.111206 | x4*x5 | -0.43012 | x3*x15 | -0.45868 | x9*x14 | 0.313482 | x9*x21 | 0.195594 | x10^2 |
| 0.300702 | x1*x9 | 0.032471 | x4*x14 | -0.06612 | x10*x13 | -0.24109 | x10*x20 | 0.330053 | x11^2 |
| 1.018083 | x2*x8 | -0.30396 | x5*x13 | 0.60863 | x11*x12 | -0.53689 | x11*x19 | 0.277344 | x12^2 |
| -0.10315 | x3*x7 | 0.183938 | x6*x12 | -0.3604 | x3*x21 | 0.103272 | x12*x18 | -0.09416 | x13^2 |
| 0.070862 | x4*x6 | 0.693381 | x7*x11 | 0.454649 | x4*x20 | -0.01408 | x13*x17 | -0.19134 | x14^2 |
| -0.13035 | x1*x10 | 0.550191 | x8*x10 | -0.50068 | x5*x19 | 0.171848 | x14*x16 | 0.131254 | x15^2 |
| 0.124213 | x2*x9 | -0.13221 | x1*x18 | 0.027136 | x6*x18 | 0.313665 | x10*x21 | 0.130246 | x16^2 |
| -0.12947 | x3*x8 | 0.316197 | x2*x17 | 0.36257 | x7*x17 | -0.22487 | x11*x20 | 0.081608 | x17^2 |
| 0.231419 | x4*x7 | -0.4534 | x3*x16 | 0.398982 | x8*x16 | -0.54379 | x12*x19 | -0.07981 | x18^2 |
| -0.09398 | x5*x6 | -0.1616 | x4*x15 | -0.10406 | x9*x15 | -0.23333 | x13*x18 | 0.277497 | x19^2 |
| -0.03534 | x1*x11 | -0.29574 | x5*x14 | 0.126731 | x10*x14 | 0.137787 | x14*x17 | 0.592909 | x20^2 |
| 0.42702 | x2*x10 | -0.07873 | x6*x13 | -0.01674 | x11*x13 | 0.263116 | x15*x16 | 0.305247 | x21^2 |
| 0.608625 | x3*x9 | 0.636861 | x7*x12 | -0.31052 | x4*x21 | 0.311517 | x11*x21 | -0.54393 | K |
| 0.145762 | x4*x8 | 0.697854 | x8*x11 | -0.21696 | x5*x20 | -0.23596 | x12*x20 | | |
| 0.435415 | x5*x7 | 0.038078 | x9*x10 | -0.27888 | x6*x19 | -0.0053 | x13*x19 | | |

Figure 13

| Coef | Term | Coef | Term | Coef | Term | Coef | Term |
|---|---|---|---|---|---|---|---|
| 0.0862137 | x1 | 0.1225289 | x1*x12 | -0.218946967 | x1*x19 | 0.05618583 | x7*x18 | 0.413713323 | x14*x18 |
| 0.2766191 | x2 | 0.01714769 | x2*x11 | -0.056022335 | x2*x18 | 0.06682927 | x8*x17 | 0.038179193 | x15*x17 |
| -0.162257 | x3 | 0.04897431 | x3*x10 | 0.00885333 | x3*x17 | 0.06218192 | x9*x16 | -0.047207224 | x12*x21 |
| -0.02429 | x4 | -0.0420923 | x4*x9 | -0.044825333 | x4*x16 | 0.02333645 | x10*x15 | 0.050880457 | x13*x20 |
| -1.335897 | x5 | 0.18032408 | x5*x8 | 0.205123183 | x5*x15 | 0.17133593 | x11*x14 | 0.098029249 | x14*x19 |
| -0.466714 | x6 | 0.05579621 | x6*x7 | 0.235281043 | x6*x14 | 0.02426398 | x12*x13 | 0.04739353 | x15*x18 |
| -0.502454 | x7 | 0.13903036 | x1*x13 | 0.07799692 | x7*x13 | -0.1450365 | x5*x21 | 0.03221725 | x16*x17 |
| -0.529957 | x8 | 0.01672712 | x2*x12 | 0.033193098 | x8*x12 | -0.0199999 | x6*x20 | -0.078766965 | x13*x21 |
| -0.517232 | x9 | 0.03953873 | x3*x11 | 0.004471896 | x9*x11 | 0.03988373 | x7*x19 | -0.065779848 | x14*x20 |
| -0.322713 | x10 | -0.0097602 | x4*x10 | -0.088051672 | x1*x20 | 0.05684492 | x8*x18 | 0.093344322 | x15*x19 |
| -0.306115 | x11 | 0.23860231 | x5*x9 | -0.066776262 | x2*x19 | 0.06229827 | x9*x17 | 0.048551835 | x16*x18 |
| -0.339934 | x12 | 0.05752647 | x6*x8 | 0.0602931 | x3*x18 | 0.01797138 | x10*x16 | -0.163758342 | x14*x21 |
| -0.802464 | x13 | -0.2870222 | x1*x14 | -0.045389814 | x4*x17 | 0.01479946 | x11*x15 | 0.058089226 | x15*x20 |
| -1.746458 | x14 | -0.0793246 | x2*x13 | 0.192487995 | x5*x16 | 0.19545204 | x12*x14 | 0.09277893 | x16*x19 |
| -0.413739 | x15 | 0.04399956 | x3*x12 | 0.069075633 | x6*x15 | -0.0630592 | x6*x21 | 0.052026146 | x17*x18 |
| -0.41141 | x16 | -0.0174562 | x4*x11 | 0.226902731 | x7*x14 | -0.0200142 | x7*x20 | -0.034597806 | x15*x21 |
| -0.444364 | x17 | 0.13236464 | x5*x10 | 0.080029705 | x8*x13 | 0.04458724 | x8*x19 | 0.059136979 | x16*x20 |
| -0.676681 | x18 | 0.06474728 | x6*x9 | 0.009742609 | x9*x12 | 0.02918653 | x9*x18 | 0.097274568 | x17*x19 |
| -0.278253 | x19 | 0.05526561 | x7*x8 | -0.007210775 | x10*x11 | 0.02091947 | x10*x17 | -0.032963224 | x16*x21 |
| -0.098653 | x20 | 0.04577223 | x1*x15 | 0.131803264 | x1*x21 | 0.01005217 | x11*x16 | 0.063170984 | x17*x20 |
| 0.1807395 | x21 | -0.2339758 | x2*x14 | 0.051808809 | x2*x20 | 0.02133609 | x12*x15 | 0.094734816 | x18*x19 |
| -0.040451 | x1*x2 | 0.03783243 | x3*x13 | -1.78823E-05 | x3*x19 | 0.47478043 | x13*x14 | -0.033449455 | x17*x21 |
| 0.0245716 | x1*x3 | -0.0142042 | x4*x12 | -0.021637164 | x4*x18 | -0.0591935 | x7*x21 | 0.090223527 | x18*x20 |
| 0.0194761 | x1*x4 | 0.11399279 | x5*x11 | 0.207273067 | x5*x17 | -0.0190591 | x8*x20 | -0.005019399 | x18*x21 |
| -0.018756 | x2*x3 | 0.0371297 | x6*x10 | 0.063473864 | x6*x16 | 0.09790894 | x9*x19 | -0.099191279 | x19*x20 |
| -0.14152 | x1*x5 | 0.02706654 | x7*x9 | 0.066782063 | x7*x15 | 0.04464197 | x10*x18 | -0.035615363 | x19*x21 |
| -0.020735 | x2*x4 | 0.0279583 | x1*x16 | 0.242809007 | x8*x14 | 0.01242062 | x11*x17 | -0.057277324 | x20*x21 |
| -0.001106 | x1*x6 | -0.0412766 | x2*x15 | 0.051211974 | x9*x13 | 0.01611116 | x12*x16 | -0.134011601 | x1^2 |
| -0.132271 | x2*x5 | -0.0983383 | x3*x14 | -0.002769035 | x10*x12 | 0.08217173 | x13*x15 | 0.060176396 | x2^2 |
| 0.0205765 | x3*x4 | 0.01297209 | x4*x13 | 0.119397443 | x2*x21 | -0.0629366 | x8*x21 | -0.018063162 | x3^2 |
| -0.043607 | x1*x7 | 0.13385684 | x5*x12 | 0.078162871 | x3*x20 | 0.02094208 | x9*x20 | 0.019266028 | x4^2 |
| -0.017633 | x2*x6 | 0.02704499 | x6*x11 | -0.003896197 | x4*x19 | 0.07567922 | x10*x19 | 0.245142242 | x5^2 |
| -0.00039 | x3*x5 | 0.03680297 | x7*x10 | 0.299039089 | x5*x18 | 0.03216104 | x11*x18 | 0.029020583 | x6^2 |
| -0.041089 | x1*x8 | 0.02803092 | x8*x9 | 0.068587434 | x6*x17 | 0.01861621 | x12*x17 | 0.027681443 | x7^2 |
| -0.035035 | x2*x7 | 0.03289805 | x1*x17 | 0.061748953 | x7*x16 | 0.07301247 | x13*x16 | 0.027608637 | x8^2 |
| 0.0473947 | x3*x6 | -0.050661 | x2*x16 | 0.068127087 | x8*x15 | 0.26926901 | x14*x15 | 0.009077815 | x9^2 |
| 0.0818254 | x4*x5 | 0.00983321 | x3*x15 | 0.34351302 | x9*x14 | -0.0768313 | x9*x21 | 8.40882E-05 | x10^2 |
| 0.0767563 | x1*x9 | 0.18702958 | x4*x14 | 0.042253835 | x10*x13 | 0.0296648 | x10*x20 | -0.006639298 | x11^2 |
| -0.038248 | x2*x8 | 0.34465321 | x5*x13 | -0.010112716 | x11*x12 | 0.0701167 | x11*x19 | -0.003249782 | x12^2 |
| 0.046466 | x3*x7 | 0.03473583 | x6*x12 | 0.07895254 | x3*x21 | 0.0360067 | x12*x18 | 0.047109067 | x13^2 |
| -0.012874 | x4*x6 | 0.02782407 | x7*x11 | 0.058537835 | x4*x20 | 0.07479933 | x13*x17 | 0.386067395 | x14^2 |
| 0.1124253 | x1*x10 | 0.03625771 | x8*x10 | 0.092734509 | x5*x19 | 0.25527583 | x14*x16 | 0.020578637 | x15^2 |
| -0.043599 | x2*x9 | 0.10683413 | x1*x18 | 0.09037097 | x6*x18 | -0.0453557 | x10*x21 | 0.014474901 | x16^2 |
| 0.0493114 | x3*x8 | -0.0531316 | x2*x17 | 0.065207656 | x7*x17 | 0.02641862 | x11*x20 | 0.017813791 | x17^2 |
| -0.004914 | x4*x7 | 0.00568157 | x3*x16 | 0.063402697 | x8*x16 | 0.07686353 | x12*x19 | 0.040481856 | x18^2 |
| 0.1770291 | x5*x6 | -0.0408659 | x4*x15 | 0.056172857 | x9*x15 | 0.05766861 | x13*x18 | -0.03175112 | x19^2 |
| 0.1119905 | x1*x11 | 0.62258534 | x5*x14 | 0.187742558 | x10*x14 | 0.27443882 | x14*x17 | -0.078274452 | x20^2 |
| 0.0182733 | x2*x10 | 0.10499793 | x6*x13 | 0.017328016 | x11*x13 | 0.03497687 | x15*x16 | -0.010829875 | x21^2 |
| 0.0702538 | x3*x9 | 0.03411994 | x7*x12 | 0.063269505 | x4*x21 | -0.0430756 | x11*x21 | 0.867397934 | K |
| -0.007362 | x4*x8 | 0.02666294 | x8*x11 | -0.053022058 | x5*x20 | 0.02899022 | x12*x20 | | |
| 0.1705393 | x5*x7 | 0.01736107 | x9*x10 | 0.043756171 | x6*x19 | 0.13055401 | x13*x19 | | |

Figure 14

METHOD OF DETERMINING A MEDIA CLASS IN AN IMAGING DEVICE USING AN OPTICAL TRANSLUCENCE SENSOR

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Disclosure

The present disclosure relates generally to imaging device media sensors and methods of using the same, and more particularly to media translucence sensors and methods of using the same.

2. Description of the Related Art

Currently, most imaging devices require the user to input media type, media weight, and texture. However, most users do not adjust media settings. Of those users that do adjust settings, only a small percentage correctly classify media. Failure to correctly set media properties results in print quality defects, poor fuse grade, and higher jam rates. Also, this leads to a higher number of service calls, visits, and replacement part rates.

Incorrectly setting media weight is a major contributor to these higher failure rates. If the media weight is set too low, the printer runs too fast, transfer voltages are set too low, and fuser temperatures are set too low. If the media weight is set too high, the printer runs too slow, transfer voltages are set too high, and fuser temperatures are set too high. Poor print quality is a result along with premature hardware failures.

In particular, light weight media set at a normal or a heavy weight has a much higher likelihood to wrap a fuser, particularly, when printing higher coverage pages. Too much heat is provided and the toner hot offsets. Because the trend is towards using lighter weight media with more refined (recycled) fiber content, this problem will become more prevalent.

Additionally, heavy weight media set at normal or light weight does not adequately melt the toner and cold offset occurs. This allows unattached toner to deposit on the fuser backup roll and be carried downstream where it contaminates paper guides and creates catch points. This results in a higher likelihood for jams, fuser being wrapped by media (fuse wraps), and machine damage on subsequent jobs. Ultimately, if media is run at an improper weight setting, user satisfaction suffers.

For the detection of media class, optical sensors often strike a reasonable balance between cost, performance, speed, and footprint when compared to other alternatives. Perhaps one of the simplest optical sensor embodiments involves using a photo detector, such as a photo-transistor for measuring the intensity of a light beam, emitted by light source such as a LED, passing through a sheet of media. Unfortunately, the analog output provided by the simplest implementation is often too variable to provide much confidence in a media class determination made from a dynamic measurement taken with this sensor arrangement. The amount of transmitted light reaching the photo-transistor is a strong function of LED intensity, wavelength, and several external factors including media composition, media position, media surface roughness, media thickness, and sensor component variability. These external factors are sources of variation that must be accommodated to ensure reliable media class determinations.

Historically, sensor output variation has been addressed through judicious architectural decisions in the structure of an imaging device, the use of media staging algorithms, expensive optics, more complex camera hardware, and/or computationally intense signal processing. These solutions are often costly, unreliable, and/or inefficient.

It would be advantageous to be able to use a simple low cost photodetector and LED sensor to be able to provide dynamic reliable media class determinations of a sheet of media as it is being fed along a media feed path in an imaging device prior to being processed. It would be further advantageous to be able to use a low-cost, space-efficient optical translucency sensor that is capable of classifying media into several different categories with a very high accuracy rate without negatively impacting throughput. It would additionally be desirable to be able to adjust an operating parameter of the imaging device or a subsystem thereof based on the selected media class.

SUMMARY

Disclosed is a method of determining a media class using an optical translucence sensor to provide intrinsic media variables data along with extrinsic process variables data from temperature and humidity sensors. An imaging device uses a media set having predetermined number of a media classes. The imaging device includes a media processing device, a plurality of media input sources, a media feeding system in communication with the media processing device and the plurality of media input sources, an optical translucence sensor (OTS) mounted on a media path between the plurality of media input sources and the media processing device, a temperature sensor, and a relative humidity sensor. The imaging device is operable at a plurality of media process rates with the media feeding system feeding a media sheet to the media processing device for processing. The OTS has an output signal representative of the translucence of the media sheet. The method of determining a media class from the media set comprises:

storing in memory of the imaging device a media class determining equation set incorporating a predetermined plurality of media class determining equations using a predetermined set of variables wherein each equation corresponds to one media class of the media set;

measuring the temperature and relative humidity;

calculating a moisture content value using the measured temperature and relative humidity values;

determining a selected media source from the plurality of media sources;

determining a process rate from the plurality of process rates;

forming an extrinsic variables data including the selected media source, the determined process rate, the calculated moisture content, the measured temperature, and the measured relative humidity;

determining whether or not an OTS calibration event has occurred;

upon determining that an OTS calibration event has occurred performing a calibration of the OTS wherein, with no media sheet to be processed present therein, the output signal of the OTS is set to a predetermined value by adjusting an input current to the OTS;

feeding the media sheet to be processed into a nip formed between a pair of feed rolls positioned along the media path prior to the OTS;

on the occurrence of a trigger event, feeding the media sheet to be processed through the OTS;

determining whether or not the OTS output signal is greater than a predetermined threshold value upon determining that the OTS output signal is not above the predetermined threshold value then repeating the action of determining whether or not the OTS output signal value is greater than the predetermined threshold value;

upon determining that the OTS output signal is above the predetermined threshold value periodically measuring the OTS output signal value at a plurality of predefined interest zones as the media sheet to be processed is feed from the nip through the OTS forming an intrinsic variables data;

forming a variables data set from the extrinsic process variables data and the intrinsic media variables data;

normalizing the variables data set;

solving the media class determining equation set using the normalized variables data set to determine for the media sheet to be processed a media class from the media set;

determining whether or not the determined media class matches a selected media class setting for the media processing device;

upon determining that the determined media class matches the selected media class setting:

selecting, based upon the selected media class setting, at least one operational parameter for the media processing device for processing the media sheet to be processed; and, feeding the media sheet to be processed to the media processing device; and upon determining that the determined media class does not match the selected media class setting:

incrementing a mismatch count for the selected media class setting;

determining whether or not there have been more than a predetermined number of mismatches;

upon determining that the number of mismatches does not exceed the predetermined number of mismatches then repeating the actions of selecting based on the selected media class setting at least one operational parameter for the media processing device for processing the media sheet to be processed; and feeding the media sheet to be processed to the media processing device; and, upon determining that the number of mismatches does exceed the predetermined number of mismatches:

using a mismatch look up table determine whether or not mismatch is acceptable;

upon determining that the mismatch is acceptable:

repeating the actions of selecting based on the selected media class setting at least one operational parameter for the media processing device for processing the media sheet to be processed and feeding the media sheet to be processed to the media processing device; and, upon determining that the mismatch is not acceptable: selecting based on the determined media class, at least one operational parameter for the media processing device for processing the media sheet to be processed and feeding the media sheet to be processed to the media processing device.

BRIEF DESCRIPTION OF THE DRAWINGS

The above-mentioned and other features and advantages of the disclosed embodiments, and the manner of attaining them, will become more apparent and will be better understood by reference to the following description of the disclosed embodiments in conjunction with the accompanying drawings.

FIG. 9 is a table of the features or factors used by the media class determining equation set.

FIGS. 10-14 are tables of equation factors forming an example media class determining equation for light weight media, normal weight media, heavy weight media, cardstock media and transparency media, respectively.

DETAILED DESCRIPTION

Figure 1:
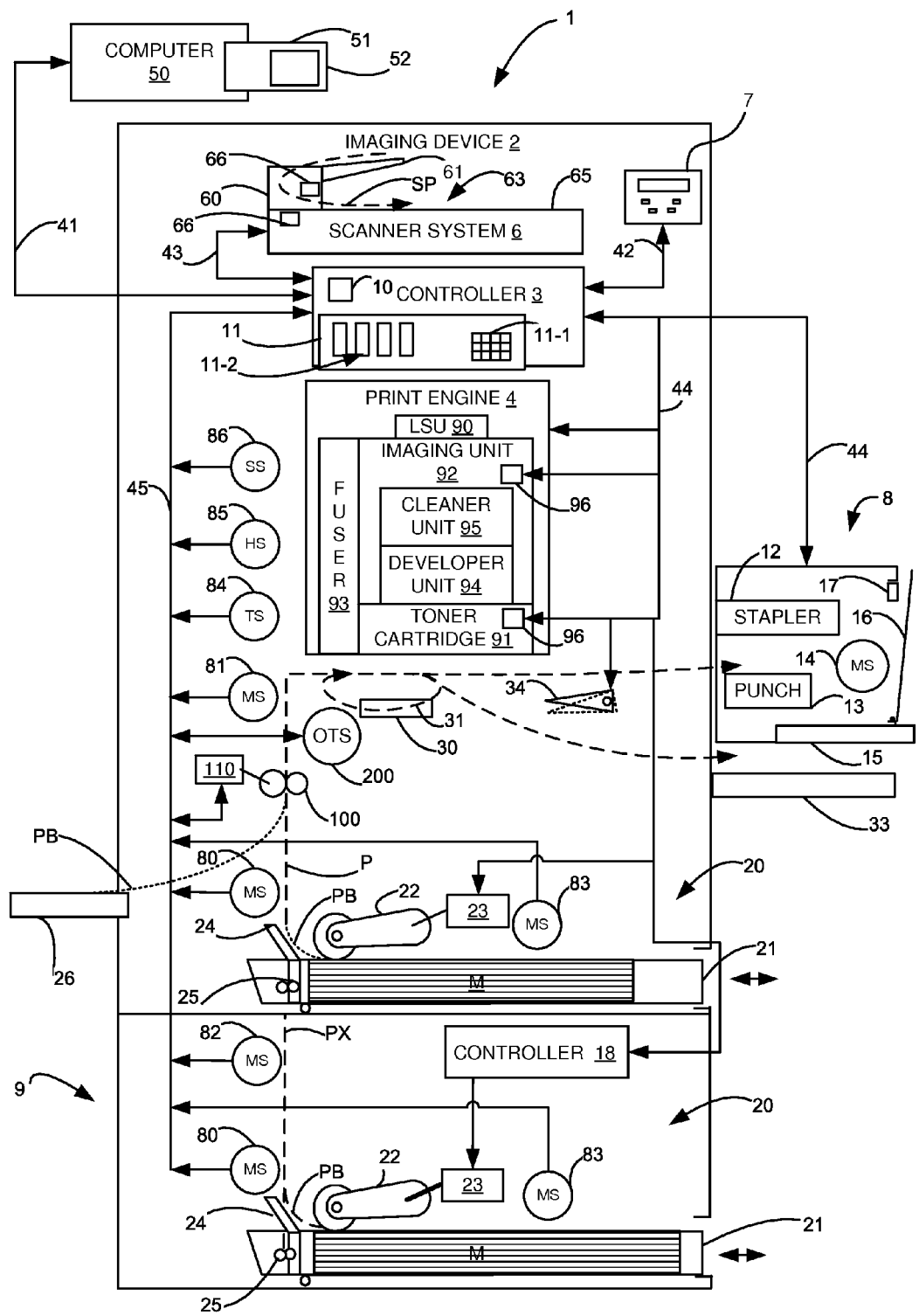
FIG. 1 is a schematic illustration of an imaging system including an imaging device.

It is to be understood that the present disclosure is not limited in its application to the details of construction and the arrangement of components set forth in the following written description or illustrated in the drawings. The present disclosure is capable of other embodiments and of being practiced or of being carried out in various ways. Also, it is to be understood that the phraseology and terminology used herein is for the purpose of description and should not be regarded as limiting. As used herein, the terms "having", "containing", "including", "comprising", and the like are open-ended terms that indicate the presence of stated elements or features, but do not preclude additional elements or features. The articles "a", "an", and "the" are intended to include the plural as well as the singular, unless the context clearly indicates otherwise. The use of "including," "comprising," or "having" and variations thereof herein is meant to encompass the items listed thereafter and equivalents thereof, as well as, additional items.

Terms such as "about" and the like that have a contextual meaning, are used to describe various characteristics of an object, and such terms have their ordinary and customary meaning to persons of ordinary skill in the pertinent art. Terms such as "about" and the like, in a first context mean "approximately" to an extent as understood by persons of ordinary skill in the pertinent art; and, in a second context, are used to describe various characteristics of an object, and in such second context mean "within a small percentage of" as understood by persons of ordinary skill in the pertinent art.

Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Spatially relative terms such as "top", "bottom", "front", "back", "rear", "side", "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

In addition, it should be understood that embodiments of the present disclosure include both hardware and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects of the invention may be implemented in software. As such, it should be noted that a plurality of hardware and software-based devices, as well as a plurality of different structural components may be utilized to implement the invention. Furthermore, and as described in subsequent paragraphs, the specific mechanical configurations illustrated in the drawings are intended to exemplify embodiments of the present disclosure and that other alternative mechanical configurations are possible.

It will be further understood that each block of the diagrams, and combinations of blocks in the diagrams, respectively, may be implemented by computer program instructions. These computer program instructions may be loaded onto a general purpose computer, special purpose computer, processor, or other programmable data processing apparatus to produce a machine, such that the instructions which execute on the computer or other programmable data processing apparatus may create means for implementing the functionality of each block or combinations of blocks in the diagrams discussed in detail in the descriptions below. These computer program instructions may also be stored in a non-transitory, tangible, computer readable storage medium that may direct a computer or other programmable data processing apparatus to function in a particular manner, such that the instructions stored in the computer readable storage medium may produce an article of manufacture including an instruction means that implements the function specified in the block or blocks. Computer readable storage medium includes, for example, disks, CD-ROMS, flash ROMS, nonvolatile ROM and RAM. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus implement the functions specified in the block or blocks. The results of the computer program instructions may be displayed in a user interface or computer display of the computer or other programmable apparatus that implements the functions or the computer program instructions.

When applied to media, the term "output" as used herein encompasses media from any printing device such as color and black-and-white copiers, color and black-and-white printers, and multifunction devices that incorporate multiple functions such as scanning, copying, and printing capabilities in one device. Such printing devices may utilize ink jet, dot matrix, dye sublimation, laser, and any other suitable print formats. The term "button" as used herein means any component, whether a physical component or graphic user interface icon, that is engaged to initiate an action or event.

The term "image" as used herein encompasses any printed or electronic form of text, graphics, or a combination thereof. "Media" or "media sheet" refers to a material that receives a printed image or, with a document to be scanned, a material containing a printed image. The media is said to move along the media path and the media path extensions from an upstream location to a downstream location as it moves from the media trays to the output area of the imaging device. For a top feed option tray, the top of the option tray is downstream from the bottom of the option tray. Conversely, for a bottom feed option tray, the top of the option tray is upstream from the bottom of the option tray. As used herein, the leading edge of the media is that edge which first enters the media path and the trailing edge of the media is that edge that last enters the media path. Depending on the orientation of the media in a media tray, the leading/trailing edges may be the short edge of the media or the long edge of the media, in that most media is rectangular. As used herein, the term "media width" refers to the dimension of the media that is transverse to the direction of the media path. The term "media length" refers to the dimension of the media that is aligned to the direction of the media path. "Media process direction" describes the movement of media within the imaging system, and is generally means from an input toward an output of the imaging system 1. Further, relative positional terms may be used herein. For example, "superior" means that an element is above another element. Conversely "inferior" means that an element is below or beneath another element Media is conveyed using pairs of aligned rolls forming feed nips. The term "nip" is used in the conventional sense to refer to the opening formed between two rolls that are located at about the same point in the media path. The rolls forming the nip may be separated apart, be tangent to each other, or form an interference fit with one another. With this nip type, the axes of the rolls are parallel to one another and are typically, but do not have to be, transverse to the media path. For example, a deskewing nip may be at an acute angle to the media feed path. The term "separated nip" refers to a nip formed between two rolls that are located at different points along the media path and have no common point of tangency with the media path. Again, the axes of rotation of the rolls having a separated nip are parallel but are offset from one another along the media path. Nip gap refers to the space between two rolls. Nip gaps may be positive, where there is an opening between the two rolls, zero, where the two rolls are tangentially touching, or negative, where there is an interference fit between the two rolls.

As used herein, the term "communication link" is used to generally refer to a structure that facilitates electronic communication between multiple components. While several communication links are shown, it is understood that a single communication link may serve the same functions as the multiple communication links that are illustrated. Accordingly, a communication link may be a direct electrical wired connection, a direct wireless connection (e.g., infrared or r.f.), or a network connection (wired or wireless), such as for example, an Ethernet local area network (LAN) or a wireless networking standard, such as IEEE 802.11. Devices interconnected by a communication link may use a standard communication protocol, such as for example, universal serial bus (USB), Ethernet or IEEE 802.xx, or other communication protocols. The terms "input" and "output" when applied to a sensor, circuit or other electronic device means an electrical signal that is produced by or is acted upon by such sensor, circuit or electronic device. Such electrical signals may be analog or digital signals.

Referring now to the drawings and particularly to FIG. 1, there is shown a diagrammatic depiction of an imaging system 1. As shown, imaging system 1 may include an imaging device 2, and an optional computer 50 attached to the imaging device 2. Imaging system 1 may be, for example, a customer imaging system, or alternatively, a development tool used in imaging apparatus design. Imaging device 2 is shown as a multifunction machine that includes a controller 3, a print engine 4, a scanner system 6, a user interface 7, a finisher 8, and/or one or more option assemblies 9.

Controller 3 includes a processor unit 10 and associated memory 11, and may be formed as one or more Application Specific Integrated Circuits (ASICs). Memory 11 may be any volatile or non-volatile memory or combination thereof such as, for example, random access memory (RAM), read only memory (ROM), flash memory and/or non-volatile RAM (NVRAM). Alternatively, memory 11 may be in the form of a separate electronic memory (e.g., RAM, ROM, and/or NVRAM), a hard drive, a CD or DVD drive, or any memory device convenient for use with controller 3. One or more look-up tables 11-1 may be provided in memory 11.

In FIG. 1, controller 3 is illustrated as being communicatively coupled with computer 50 via communication link 41, with user interface 7 via communication link 42, and with scanner system 6 via communication link 43. Controller 3 is illustrated as being communicatively coupled with print engine 4, and finisher 8, including stapler 12, punch 13 and sensors 14, 17, via communication link 44.

Computer 50 includes in its memory 51 a software program including program instructions that function as an imaging driver 52, e.g., printer/scanner driver software, for imaging device 2. Imaging driver 52 is in communication with controller 3 of imaging device 2 via communication link 41. Imaging driver 52 facilitates communication between imaging device 2 and computer 50. One aspect of imaging driver 52 may be, for example, to provide formatted print data to imaging device 2, and more particularly to print engine 4, to print an image. Another aspect of imaging driver 52 may be, for example, to facilitate collection of scanned data from scanner system 6. In some circumstances, it may be desirable to operate imaging device 2 in a standalone mode. In the standalone mode, imaging device 2 is capable of functioning without computer 50. Accordingly, all or a portion of imaging driver 52, or a similar driver, may be located in controller 3 of imaging device 2 so as to accommodate printing and/or scanning functionality when operating in the standalone mode.

Print engine 4, scanner system 6, user interface 7 and finisher 8 may include firmware modules, generally designated 11-2, maintained in memory 11 which may be performed by controller 3 or another processing element. Controller 3 may be, for example, a combined printer, scanner and finisher controller. Controller 3 serves to process print data and to operate print engine 4 and toner cartridge 91 during printing, as well as to operate scanner system 6 and process data obtained via scanner system 6 for printing or transfer to computer 50. Controller 3 may provide to computer 50 and/or to user interface 7 status indications and messages regarding the media, including scanned media and media to be printed, imaging device 2 itself or any of its subsystems, consumables status, etc. Computer 50 may provide operating commands to imaging device 2. Computer 50 may be located nearby imaging device 2 or be remotely connected to imaging device 2 via an internal or external computer network. Imaging device 2 may also be communicatively coupled to other imaging devices.

Scanner system 6 may employ scanning technology as is known in the art including for example, CCD scanners, optical reduction scanners or combinations of these and other scanner types. Scanner system 6 is illustrated as having an automatic document feeder (ADF) 60 having a media input tray 61 and a media output area 63. Two scan bars 66 may be provided—one in ADF 60 and the other in the base 65—to allow for scanning both surfaces of the media sheet as it is fed from input tray 61 along scan path SP to output area 63. Imaging device 2 may also be configured to be a printer without scanning.

Finisher 8 may include a stapler 12, a punch 13, one or more media sensors 14, various media reference and alignment surfaces and an output area 15 for holding finished media. Finisher 8 may also have a door 16 and a door open sensor 17. Similar doors and sensors may also be provided on the housing of imaging device 2 and are not shown for purposes of clarity.

Print engine 4 is illustrated as including a laser scan unit (LSU) 90, a toner cartridge 91, an imaging unit 92, and a fuser 93, all mounted within imaging device 2. Imaging unit 92 and toner cartridge 91 are supported in their operating positions so that toner cartridge 91 is operatively mated to imaging unit 92 while minimizing any unbalanced loading forces applied by the toner cartridge 91 on imaging unit 92. Imaging unit 92 is removably mounted within imaging device 2 and includes a developer unit 94 that houses a toner sump and a toner delivery system. The toner delivery system includes a toner adder roll that provides toner from the toner sump to a developer roll. A doctor blade provides a metered uniform layer of toner on the surface of the developer roll. Imaging unit 92 also includes a cleaner unit 95 that houses a photoconductive drum and a waste toner removal system. An exit port on toner cartridge 91 communicates with an entrance port on developer unit 94 allowing toner to be periodically transferred from toner cartridge 91 to resupply the toner sump in developer unit 94. Both imaging unit 92 and toner cartridge 91 may be replaceable items for imaging device 2. Imaging unit 92 and toner cartridge 91 may each have a memory device 96 mounted thereon for providing component authentication and information such as type of unit, capacity, toner type, toner loading, pages printed, etc. Memory device 96 is illustrated as being in operative communication with controller 3 via communication link 44. While print engine 4 is illustrated as being an electrophotographic printer, those skilled in the art will recognize that print engine 4 may be, for example, an ink jet printer and one or more ink cartridges or ink tanks or a thermal transfer printer; other printer mechanisms and associated image forming material.

The electrophotographic imaging process is well known in the art and, therefore, will be briefly described. During an imaging operation, laser scan unit 90 creates a latent image by discharging portions of the charged surface of photoconductive drum in cleaner unit 95. Toner is transferred from the toner sump in developer unit 94 to the latent image on the photoconductive drum by the developer roll to create a toned image. The toned image is then transferred either directly to a media sheet received in imaging unit 92 from one of media input trays 21 or to an intermediate transfer member and then to a media sheet. Next, the toned image is fused to the media sheet in fuser 93 and sent to an output location 33, finisher 8 or a duplexer 30. One or more gates 34, illustrated as being in operable communication with controller 3 via communication link 44, are used to direct the media sheet to output location 33, finisher 8 or duplexer 30. Toner remnants are removed from the photoconductive drum by the waste toner removal system housed within cleaner unit 95. As toner is depleted from developer unit 94, toner is transferred from toner cartridge 91 into developer unit 94. Controller 3 provides for the coordination of these activities including media movement occurring during the imaging process.

Controller 3 also communicates with a controller 18 in option assembly 9, via communication link 44, provided within each option assembly 9 that is provided in imaging device 2. Controller 18 operates various motors housed within option assembly 9 that position media for feeding, feed media from media path branches PB into media path P or media path extensions PX as well as feed media along media path extensions PX. Controllers 3, 18 control the feeding of media along media path P and control the travel of media along media path P and media path extensions PX.

Imaging device 2 and option assembly 9 each also include a media feed system 20 having a removable media input tray 21 for holding media M to be printed or scanned, a pick mechanism 22, a drive mechanism 23 positioned adjacent removable media input trays 21. Each media tray 21 also has a media dam assembly 24 and a feed roll assembly 25. In imaging device 2, pick mechanism 22 is mechanically coupled to drive mechanism 23 that is controlled by controller 3 via communication link 44. In option assembly 9, pick mechanism 22 is mechanically coupled to drive mechanism 23 that is controlled by controller 3 via controller 18 and communication link 44. In both imaging device 2 and option assembly 9, pick mechanisms 22 are illustrated in a position to drive a topmost media sheet from the media stack M into media dam 24 which directs the picked sheet into media path P or extension PX. Bottom feed media trays may also be used. As is known, media dam 24 may or may not contain one or more separator rolls and/or separator strips used to prevent shingled feeding of media from media stack M. Feed roll assemblies 25, comprised of two opposed rolls—a driven roll under control of controllers 3 and/or 18 and an idler roll—feed media from an inferior unit to a superior unit via a slot provided therein.

In imaging device 2, a media path P (shown in dashed line) is provided from removable media input tray 21 extending through print engine 4 to output area 33, or when needed to finisher 8 or to duplexer 30. Media path P may also have extensions PX and/or branches PB (shown in dotted line) from or to other removable media input trays as described herein such as that shown in option assembly 9. Media path P may include a multipurpose input tray 22 provided on the housing of imaging device 2 or be incorporated into removable media tray 21 provided in imaging device 2 and a corresponding path branch PB that merges with the media path P within imaging device 2. Along media path P and its extensions PX are provided media position sensors 80-83 which are used to detect the position of the media, usually the leading and trailing edges of the media, as it moves along the media path P or path extension PX. Media position sensor 80 is located adjacent to the point at which media is picked from each of the media trays 21 while media position sensors 81, 82 are positioned further downstream from their respective media tray 21 along media path P or path extension PX. Media position sensor 81 also accommodates media fed along path branch PB from multipurpose media tray 26 and is illustrated at a position downstream of feed roll pair 100. Media position sensor 82 is illustrated at a position on path extension PX downstream of media tray 21 in option assembly 9. Additional media position sensors may be located throughout media path P and a duplex path 31, when provided, and their positioning is a matter of design choice. Media position sensors 14, and 80-82 may be an optical interrupter or a limit switch or other type of edge detector as is known to a person of skill in the art and detect the leading and trailing edges of each sheet of media as it travels along the media path P, path branch PB or path extension PX.

Media size sensors 83 are provided in image forming device 2 and each option assembly 9 to sense the size of media being feed from removable media input trays 21. To determine media sizes such as Letter, A4, A6, Legal, etc., media size sensors 83 detect the location of adjustable trailing edge media supports and one or both adjustable media side edge media supports provided within removable media input trays 21 as is known in the art. Sensors 80-83 are shown in communication with controller 3 via communication link 45.

Media feed roll pair 100 is driven by a drive mechanism 110. Positioned downstream of media feed roll pair 100 and media sensor 80 is an optical translucence sensor (OTS) assembly 200. Downstream of OTS assembly 200 are one or more media processing devices, such as scanner system 6, stapler 12, hole punch 13, duplexer 30, and fuser 93 and developer unit 94 of print engine 4. Drive mechanism 110 and OTS assembly 200 are in communication with controller 3 via communication link 45. OTS assembly 200 may also be located upstream of feed roll pair 100. Also provided on communication link 45 are a temperature sensor 84, a relative humidity sensor 85 and a process speed sensor 86.

Figure 2:
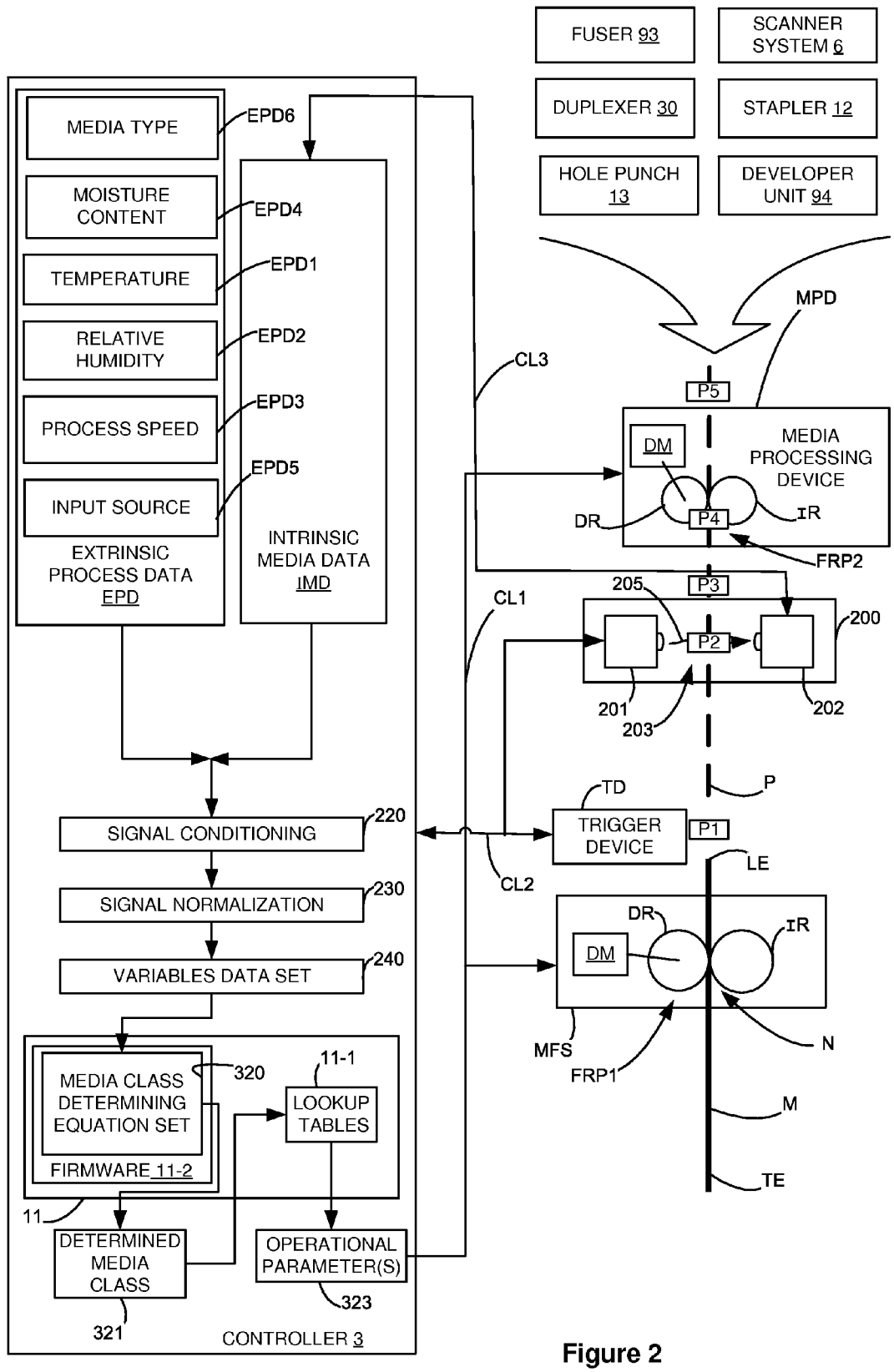
FIG. 2 is a schematic illustration of a system utilizing the presently disclosed Optical Translucence Sensor (OTS) assembly according to one example embodiment.

Referring to FIG. 2, the structure and operation of OTS assembly 200 within imaging device 2 will be described. In FIG. 2, a media feeding system MFS is shown feeding a media sheet M to OTS assembly 200. Media feeding system MFS is illustrated as having a drive mechanism DM that is operatively coupled to a driven roll DR of feed roll pair FRP1 formed by driven roll DR and idler roll IR forming feed nip N. Media feeding system MFS, including a feed roll pair FRP1 having driven and idler rolls DR, IR, respectively, formed a feed nip N, is meant to be a representation of any of the various feed roll pairs available in imaging device 2 that are capable of feeding media sheet M along media path P. In one form, media feeding system MFS may be thought of as including feed roll pair 100 and drive mechanism 110 positioned along media path P upstream of the location of OTS assembly 200.

OTS assembly 200 is illustrated at a position downstream of nip N. It should be noted that this described arrangement is for illustration only. OTS assembly 200 may be located at other positions along the media path P. OTS assembly 200 includes a light emitter 201, such as LED 201, and a photo-detector 202, such as a photo-transistor, that are spaced apart from one another on opposite sides of the media path P and form a throat 203 through which media sheet M passes. A light beam 205 is shown being emitted by LED 201 and being received at photo-detector 202 at position P2. As illustrated, light beam 205 has not been attenuated by the presence of a media sheet M passing through throat 203 between LED 201 and photo-detector 202. The leading edge LE of media sheet M is illustrated as being positioned slightly upstream of trigger device TD while its trailing edge TE is shown upstream of feed roll pair FRP1.

Figure 3:
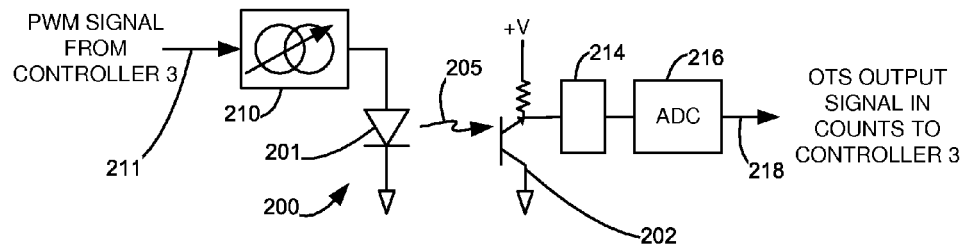
FIG. 3 is a schematic circuit for the OTS.

FIG. 3 illustrates a schematic diagram of the circuit for OTS assembly 200. LED 201 is driven by a variable current source 210. The output of current source 210 is controlled by a pulse width modulated signal 211 from controller 3 which in turn adjusts the intensity of light beam 205 of LED 201. The output of photo-transistor 202 is fed into a signal conditioning circuit 214 and then into an analog to digital converter 216 whose output signal 218 is fed back to controller 3. During calibration of OTS assembly 200 with no media present, the duty cycle of pulse width modulated signal 211 is adjusted to adjust the current flow through LED 201 so that the output of photo-transistor 202 is a predetermined value, for example, 2 volts. A calibration event may be used to initiate the calibration of OTS assembly 200. Calibration events may be triggered or initiated by the passage of a predetermined amount of time, the processing of a predetermined number of media sheets, or prior to the passage of each media sheet M into OTS assembly 200.

Figure 4:
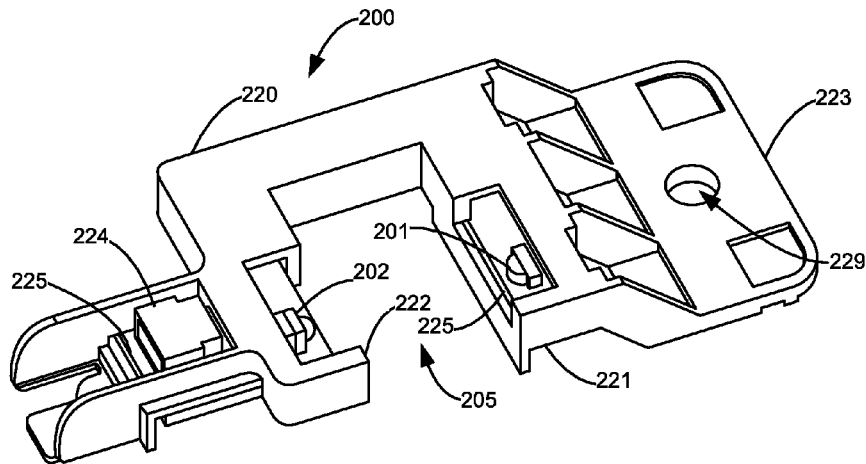
FIG. 4 illustrates a one piece example embodiment of an OTS assembly.
Figure 5:
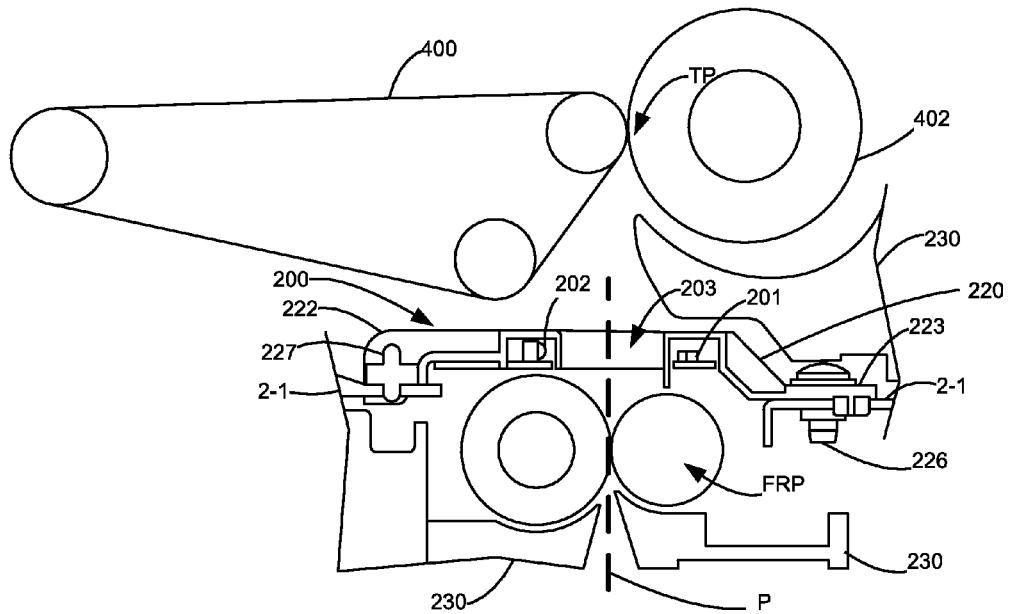
FIG. 5 illustrates the placement of the OTS assembly of FIG. 4 within one example embodiment of an imaging device.

FIG. 4 illustrates one example form of OTS assembly 200. A single piece u-shaped frame 220 houses LED 201 on one arm 221 with photo-transistor 202 being housed on the other arm 222. Mounting tab 223 is illustrated as extending from arm 221. An electrical connector 224 is provided outside of and adjacent to arm 222 of frame 220. LED 201, photo-transistor 202, and connector 224 are mounted on a u-shaped circuit board 225 mounted in frame 220. In FIG. 5, frame 220 is shown mounted across media path P in an example imaging device 2 upstream of a feed roll pair FRP and downstream of a transfer point TP between a transfer roll 402 and an intermediate transfer belt assembly 400. A toned image on intermediate transfer assembly 400 is transferred to a media sheet passing through transfer point TP prior to entering fuser 93. Mounting tab 223 is secured by screw 226 inserted through hole 229 (see FIG. 4) to a portion of a frame 2-1 in imaging device 2. A snap-in peg 227 secures arm 222 to frame portion 2-1. The depth of throat 203 allows LED 201 and photo-detector 202 to be positioned about 6 mm inboard of a side edge of a media sheet. The width of throat 203 in this example is about 20 mm. Media guides 230 are also shown.

Figure 6:
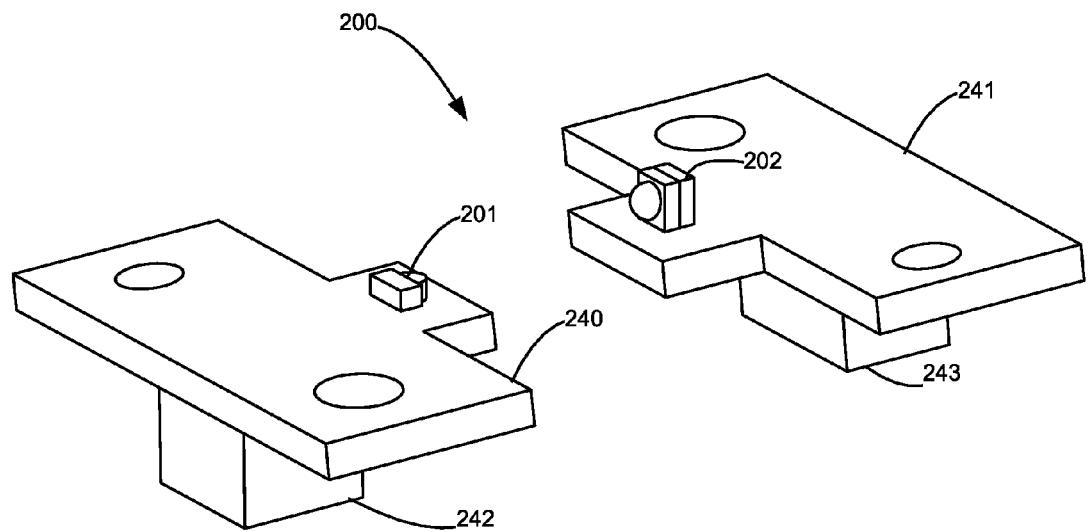
FIG. 6 illustrates a two piece example embodiment of an OTS assembly.
Figure 7:
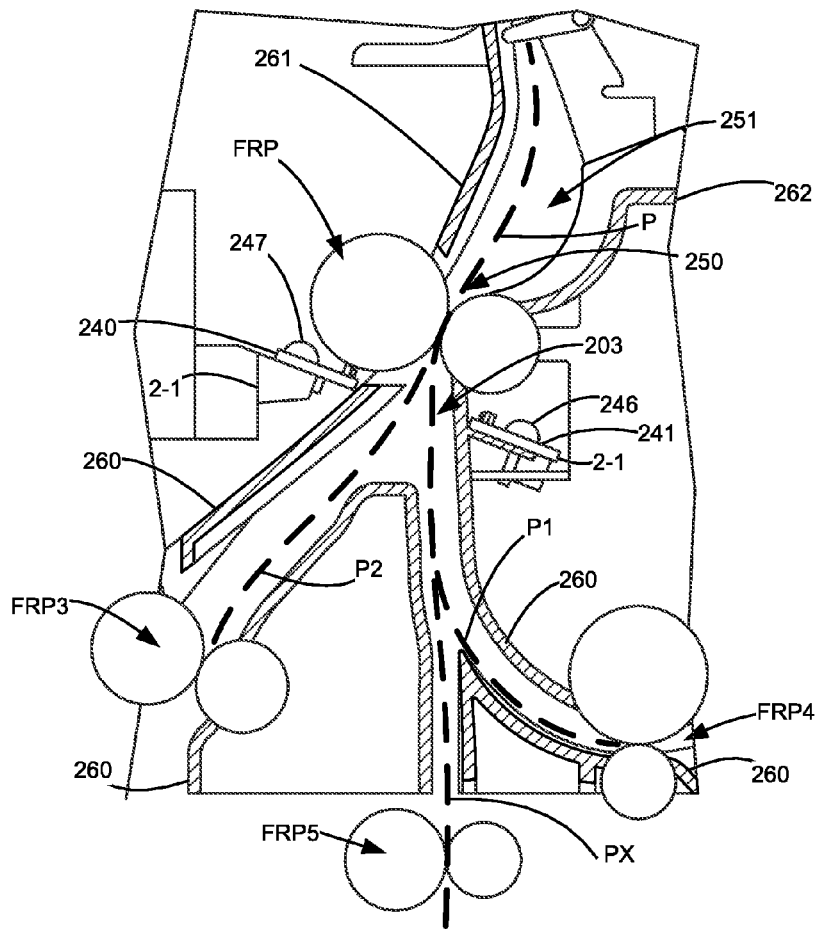
FIG. 7 illustrates the placement of the OTS assembly of FIG. 6 within another example embodiment of an imaging device.

FIG. 6 illustrates another example form of OTS assembly 200 as a two piece assembly. LED 201 is mounted on frame 240 while photo-transistor 202 is mounted on frame 241. Connectors 242, 243 are mounted on frames 240, 241, respectively, for LED 201 and photo-transistor 202, respectively. In FIG. 7, frames 240, 241, mounted by screws 246, 247, respectively to frame portion 2-1, are positioned upstream of a feed roll pair FRP across the confluence 250 of two media paths P1, P2 that combine to form media path P. Feed roll pair FRP feeds a media sheet into a bubble chamber 251 formed between media guides 261, 262. Feed roll pair FRP3 feeds media along media path P2 toward feed roll pair FRP while feed roll pair FRP4 feeds media along media path P1 toward feed roll pair FRP. Feed roll pair FRP5 feeds media along media path extension PX from an option assembly 9. Media path P1 may be one from a media tray, such as media tray 21 in imaging device 2, while media path P2 may be a return media path from a duplexer or from a multi-purpose feed tray, such as feed tray 26. The two-piece construction allows for an increased depth for throat 203 placing LED 201 and photo-detector 202 further inboard from a side edge of the media sheet, such as for example, about 37 mm inboard of a side edge of a media sheet. The width of throat 203 in this example is about 20 mm Media guides 260 are also shown positioned about media paths P, P1 and P2.

Referring back to FIG. 2, a trigger device TD is illustrated at a position upstream of OTS assembly 200 at point P1. Trigger device TD in one form may be media sensor 80 having an output signal that changes states when the leading edge LE and the trailing edge TE of media sheet M are detected. Trigger device TD may also be positioned upstream of feed roll pair FRP1. In another form, trigger device TD may be a signal sent from controller 3 to place OTS assembly 200 into a state, such as a ready state, from which an optical translucence measurement cycle on media sheet M would begin. Where trigger device TD is media sensor 80, media sensor 80 is actuated by the leading edge LE of a media sheet M being feed by feed roll pair FRP. At position P2, an output signal of media sensor 80 changes state from a first state to a second state on detection of the leading edge LE. Conversely, when a trailing edge TE of media sheet M passes media sensor 80 that state of its output signal transitions from the second state to the first state. This transition may be used to signal controller 3 to stop use of OTS assembly 200.

At position P3 the leading edge LE of media sheet M has exited OTS assembly 200. Downstream of OTS assembly 200, at point P4, is shown a media processing device MPD having at its input a second feed roll pair FRP2 positioned on media path P and which is used to guide media sheet M into the MPD. Use of feed roll pair FRP2 is illustrative only as other means of directing media sheet M into the MPD may be used. A media processing device MPD is any device within imaging system 1 that manipulates or is affected by the media where the manipulation or effect may change because of the class of media that is at the media processing device. For example stapler 12 or hole punch 13 may require a greater drive force for heavier weight media class or fuser 93 may need to be decreased in temperature or increased in speed when processing lighter weight media class. Scanner system 6, stapler 12, hole punch 13, duplexer 30, fuser 93, and developer unit 94 are shown as non-limiting examples as what is meant by the term media processing device. At point P5, the leading edge of media sheet M has exited the MPD.

Figure 8:
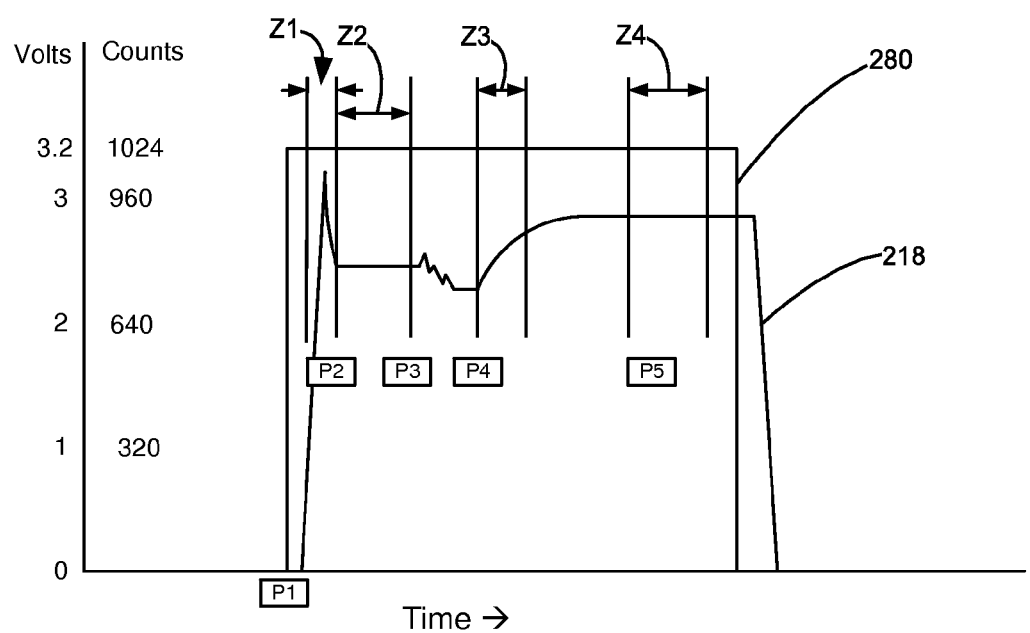
FIG. 8 illustrates a representative OTS output indicating interest zones and correlation to media leading edge positions P1-P5 along the media path shown in FIG. 2.

Referring to FIG. 8, an example output signal 218 of photo-detector 202 is shown. The Y-axis shows output voltage and the corresponding digital counts. The X-axis is time. At point P1, a trigger event has occurred and the trigger signal 280, for example, the output signal of media sensor 80, goes high. The output signal 218 reaches an initial maximum or initial peak value within interest zone Z1, and, at point P2 on the media path P where the media sheet M initially enters OTS sensor assembly 200. Between points P2 and P3, output signal 218 settles back to a first steady state value. Subsequent to position P4 within interest zone 3, the output signal 218 begins to again increase in value until at interest zone 4 a new second steady state value is reached with the media at position P5 on media path P. Thereafter, trigger signal 280 changes states and goes low. This may be due to the trailing edge of the media sheet M passing the trigger device TD or after the expiration of a predetermined time period. Thereafter, the output signal 218 goes low. The output signal 218 may be periodically sampled to collect the data in each interest zone. For example, output signal 218 may be sampled every 1-40 msec.

Media feeding system MFS and media processing device MPD are illustrated as being in operative communication with controller 3 via communication link CL1. LED 201 and trigger device TD are illustrated as being in operative communication with controller 3 via communication link CL2. The output signal of photo-detector 202 is in operative communication with controller 3 via communication link CL3. As shown the output signal of photo-detector 202 provides intrinsic media data IMD as detailed in FIG. 9 that forms an intrinsic variables data set. Extrinsic process data EPD collected from temperature, relative humidity, and process speed sensors 84-86 form an extrinsic variables data set including temperature EPD1, relative humidity EPD2, and process speed EPD3. EPD moisture content EPD4 may be calculated from the measured temperature EPD1 and relative humidity EPD2. Input source EPD5 is provided via user interface 7 or by a default value set in firmware 11-2. Similarly, a media type EPD6 may be selected by a user via user interface 7 or from a default value stored in firmware. The intrinsic variables and extrinsic variables data sets are fed to signal conditioning circuits 220 and signal normalization circuits 230 to create a variables data set 240. The media class determining equation set 320 in firmware 11-2 uses the variables data set to solve for a determined media class 321 from a predetermined media set containing a plurality of media classes. The determined media class 321 is then used to enter a look-up table to provide one or more operational parameters to be used by the media processing device MPD for the media sheet M that is to be processed.

Intrinsic variables are related to a characteristic of the media. These may include, but are not limited to, translucence, electrical impedance, reflectance, thermal capacitance, etc. Extrinsic variables include, but are not limited to, temperature, relative humidity, and/or the desired machine state, e.g., process speed. Table 1 provides example operational sensor sets that would meet several different levels of performance requirements. Optical transmission may also be referred to as optical transmission or translucence. Use of the image capture, for example, would provide some of the additional capabilities such as recognizing media having holes or preprinted portions. Optical sensors may be used to detect holes. Image capture may be done by use of charge coupled imaging device. Magnetic field may be detected by use of a Hall effect sensor. An RFID reader may be used to sense RFID tags.

TABLE 1

| Intrinsic and Extrinsic Variables | |
|---|---|
| Variable Type | Measured or Calculated Variable |
| Intrinsic | Thermal Diffusivity |
| | Acoustic Transmission |
| | Microwave Transmission |
| | Heat Capacity |
| | Impedance Phase |
| | Impedance Magnitude |
| | Resistance |
| | Capacitance |
| | Contact resistance |
| | Dielectric constant |
| | Bending Stiffness |
| | Thickness |
| | Acoustic Absorption |
| | X-Ray |
| | Optical Transmission Mean |
| | Optical Transmission Deviation |
| | Optical Spectral Reflectance |
| | Optical Diffuse Reflectance |
| | Image Capture/Process |
| | Laser Profilometry |

TABLE 1-continued

| Intrinsic and Extrinsic Variables | |
|---|---|
| Variable Type | Measured or Calculated Variable |
| Extrinsic | Temperature |
| | Relative Humidity |
| | Media Size |
| | Transfer Current |
| | Transfer Voltage |
| | Fuser Temperature |
| | Media Feed Motor Current |
| | RFID |
| | Magnetic Field |
| | Media Holes |
| | MICR |
| | Preprinted Areas |
| | Media Color |
| | Multilayer Media |

Media class determining equation set 320, consisting of one equation for each class of media to be discerned is created using a classification system which is known in the art. An example classification system will be briefly described. The classification system creates the media class determining equation set that is found in firmware 11-2 incorporated into imaging device 2. In a training or experimental environment, by the use of data sets of sampled inputs related to each of the media classes or types to be determined and extrinsic and intrinsic conditions that are the same as or comparable to those found in real world placements of imaging device 2, the classification system is able to formulate the media class determining equation set 320. Included in an example classification system is a training sensor set, a training media set comprised of a plurality of different media classes, a robot, a training imaging device substantially similar to imaging device 2, and imaging device subsystems that are substantially similar to those found in imaging device 2. A robot is simply a machine designed to perform a function of imaging device 2. For example, the training system may use a fuser robot that performs fusing, a transfer station robot that performs toned image transfer to a media sheet, or a media feed robot that emulates feeding media sheets. The training sensor set is used to measure the same extrinsic and intrinsic variables data sets that will be used in imaging device 2 but related to the training imaging device, its subsystems, and robots that form training data sets for each media class. The training imaging device, robots, and subsystems are used in a laboratory or test enclosure so that environmental conditions could be controlled when making measurements as described herein.

The training sensor set, consisting of a predetermined collection of sensors, provides data measurement points to the classification system. As is known in the art, the types and number of sensors used will vary dependent upon the media classes or types included in training media set, the ambient conditions to be measured, the type of robots and training imaging device used, functional requirements, and customer requirements for imaging device 2. The training sensor set is used in conjunction with the training media set, comprised of samples of M different media classes, and provides multiple data points for each variable in a predetermined set of intrinsic and extrinsic variables. Included in the predetermined set of variables that training sensor set measures are those relevant to each media class in the media set; ambient conditions, such as temperature and relative humidity where the training media set is located, and variables relevant to imaging device 2 such as electrical, thermal and mechanical properties measured using the robots or the training imaging device. An imaging device designer chooses variables that will provide a resolution sufficient to determine each media class M within the training media set. The list of variables set forth in FIG. 9 is one example variable data set. The chosen variables relevant to distinguishing the media classes in the training media set are empirically determined and verified. For imaging device 2, the chosen variables to be measured are measured using subsystems equivalent to the subsystems found in imaging device 2. These subsystems may be provided in the training imaging device or may be individually provided subsystems. It will be noted that each media class M in the media set is tested with each robot, the training imaging device, if present, or subsystems at several different ambient conditions and measurements are also taken at a plurality of locations within the borders of the media sheet. The use of robots and/or subsystems may obviate the need to use a training imaging device.

The training sensor set comprises extrinsic process sensors, and intrinsic media sensors that are the same as or equivalent to similar sensors that are present within imaging device 2. When such extrinsic measurements are made, each media class in the training media set and each imaging device subsystem are measured at the desired extrinsic measurement points. For example, when temperature and relative humidity are being measured, each media class in the training media set and each imaging device subsystem are measured at several different temperature and humidity points, such as, for example, 22° C. at 50% relative humidity, 25.6° C. at 80% relative humidity, and 15° C. at 8% relative humidity. These temperature and humidity points are environments in which imaging device 2 may be placed.

The data for the variable data set having M media classes in the training media set is collected in a training data set for each media class M resulting in multiple training data sets. For data in the training data sets, the media class to which that data belongs is known. For example, should training media set have three media classes M1, M2, M3, three data sets would be collected. It will be appreciated that the number of data points within each data set will number in the thousands. In general, as the media classes M to be sensed in imaging device 2 increase in number, the number of variables N measured increases so that each media class M may be determined.

For the purposes of developing a media class determining equation that can successfully classify a media class given the different variable input magnitudes, the measured sensor values are normalized prior to training. This is done because units of Ohms have no physical comparison to units of optical transmission, degrees of temperature, or percent relative humidity, etc. The goal is to compare how the media is changing with respect to its physical properties and by normalizing the inputs to the same order of magnitude this can be more easily achieved. Before formulation of the media class determining equations, these input values are normalized such that the magnitudes of each of the inputs are roughly equivalent over the range expected by imaging device 2, the media types expected to be used, expected environments of use, and one or more desired machine states, for example, 40 page per minute (ppm) process speed or 70 ppm process speed.

The M training data sets of N variables each are fed into a classifier training engine that produces a media class determining equation set containing M media class determining equations, where M is the number of media classes and N is the number of variables. It should be understood that the number of variables N does not have to equal the number of media classes M. The media type determining equation set will be replicated and installed into imaging device 2. Classifier training engine uses a supervised machine learning algorithm to map inputs (sensed media variables or properties like bending stiffness, electrical impedance, acoustic transmittance, optical reflectance, etc.) to a given media class. In supervised learning, for a given input data set, the correct output is known. For data in the M training data sets, the media class to which that data belongs is known. With a classifier training engine, results are predicted in a discrete output and input variables are mapped to discrete classes—here discrete media classes. Once the media class determining equations are formed, these equations, when placed in imaging device 2, take measured variable values from the sensor set provided in imaging device 2 as inputs and use them to determine the best class. The measured variable values are also termed instances. Classification into one of the several media classes may be done by multiclass classification or by combining multiple binary classifiers that deal with only two classes at a time. A classification scheme is advantageous since programs in many existing imaging device controllers are based upon a discrete categorization of media into type, weight, and roughness.

Classifier training engine may be one of well-known classification engines as known in the art that analyze data and recognize patterns for classification. These include a support vector engine, a neural network, a quadratic classifier, a Bayesian network, or a random forest classifier. Classifier training engine operates on the M training data sets to produce a multi-variable media class determining equation set. The media class determining equation set may be constructed in any of number of different ways. In one embodiment (created using regression techniques), it resembles a higher order multivariable polynomial. In another embodiment (created using neural networks), it resembles two theta matrices. The form of the media class determining equation will be determined by the type of classifier training engine used. Note that, once determined, the media classes determining equation set may be manipulated to take any convenient mathematical form.

For imaging device 2 shown in FIG. 2, FIGS. 10-14 set out the polynomial factors for the equations for classifying five media classes—light weight media, normal weight media, heavy weight media, card stock, and transparencies, respectively. In each equation, K represents a constant or offset. For example, the Equation 1 below shows the start of the media class determining equation for light weight media shown in FIG. 10:

$$-0.31350669x_1 + 2.50705501x_2 - 1.27206377x_3 - 0.42903456x_4 + 1.51272236x_5 - 0.90759126x_6 - 0.49354008x_7 - 0.39329021x_8 + 0.40040825x_9 - 0.46230815x_{10} - 0.87184194x_{11} - 0.73143359x_{12} + 2.26173243x_{13} + 4.7013063x_{14} - 0.2638741x_{15} - 0.24376869x_{16} - 0.02620652x_{17} + 1.477559967x_{18} - 0.70134319x_{19} - 1.21459248x_{20} - 0.47459542x_{21} \ldots + K$$

Equation 1 where the variables $x_1$-$x_{21}$ and the constant K are defined in the table shown in FIG. 10

The remaining cross terms for Equation 1 are found in FIG. 10. Similar equations for the other media classes may be constructed in a similar manner using the values found in FIGS. 11-14.

As used herein the term "light weight media" means media having a weight of 60-75 $g/m^2$; the term "normal weight media" means media having a weight of 75-90 g/m$^2$; the term "heavy weight media" means media having a weight of 90-120 g/m$^2$; the term "card stock" means media having a weight of 120-199 g/m$^2$.

A single media class determining equation is produced for each media class in the training media set so that there is a plurality of equations in the media class determining equation set 40 corresponding to the plurality of media classes in the media set to be used with imaging device 2. As is known in the art, the media class determining equations may be represented in any convenient mathematical manner that closely approximates the solution, for example, a Taylor polynomial. In one form, the classifier training engine produces a function having higher order polynomial equations that comprise the media class determining equation set 320 that is used in imaging device 2. Variable measurement values taken by the sensor set in imaging device 2 are then inputted to the function (i.e., the M media class determining equations) to determine the classes of media sensed.

Figure 15:
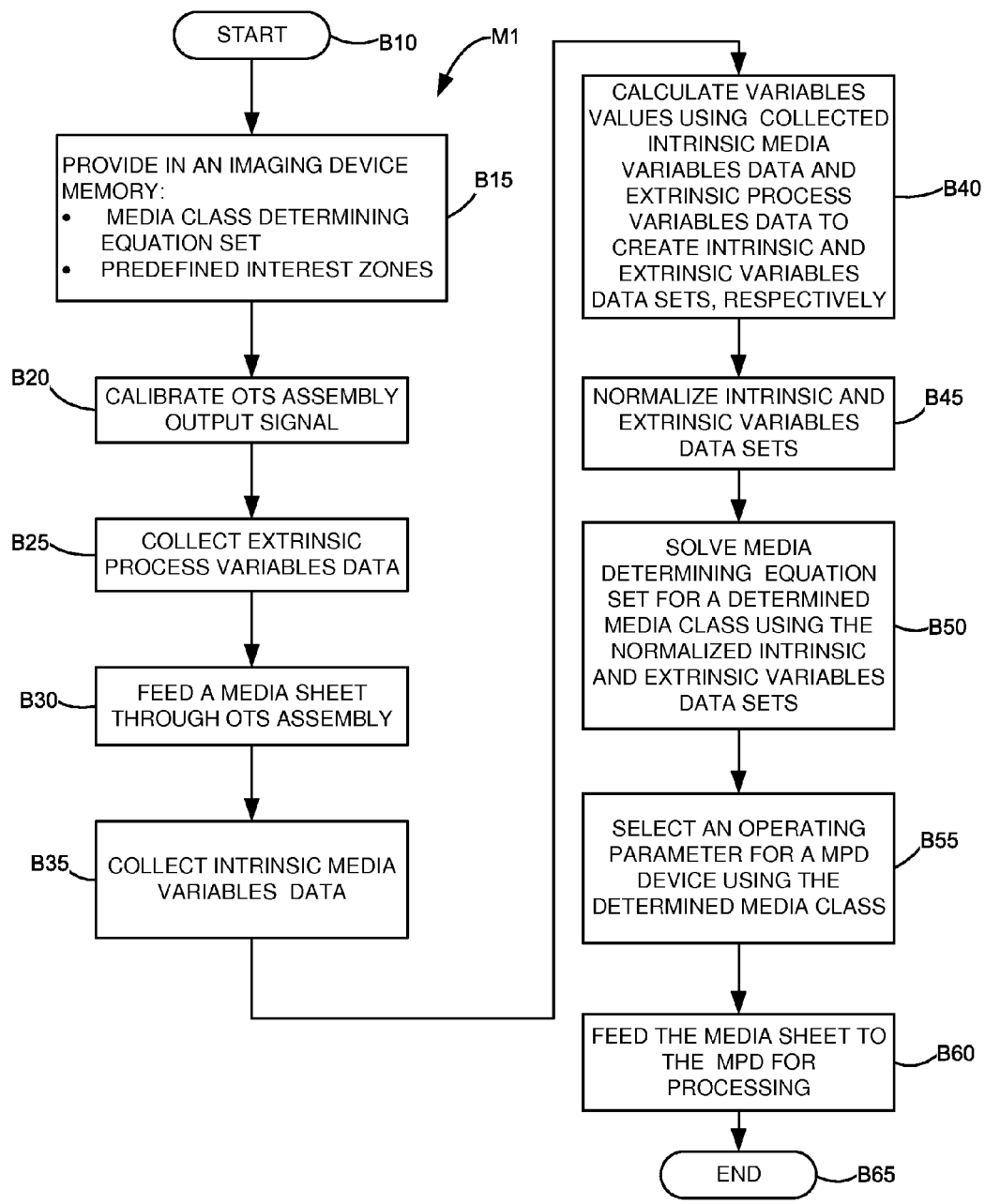
FIG. 15 is a flow chart of one example embodiment of the present method for determining a media class in an imaging device.

Referring now to FIG. 15, a block diagram of a method M1 of using the aforementioned OTS assembly 200 for determining a media class on a media sheet moveable along a media path P in imaging device 2 is illustrated. Process M1 starts at block B10 and proceeds to block B15 where the media class determining equation set and predefined interest zones, such as interest zones Z1-Z4, are stored in the memory 11 of imaging device 2. Continuing to block B20, the output signal of OTS assembly 200 is calibrated as previously described. At block B25, the collection and/or calculation of extrinsic process variables data occurs, such as measuring the temperature, relative humidity, process speed, media source, etc. At block B30, a media sheet to be processed is fed through OTS sensor assembly 200 and at block B35, collection and/or calculation of intrinsic media variables data occurs, such as by periodically sampling the output signal of OTS assembly 200 as the predefined interest zones Z1-Z4 while the media sheet to be processed passes through OTS sensor assembly 200. The intrinsic media variables are, for example, those listed in FIG. 9. Making dynamic measurements while the media sheet to be processed is moving allows for understanding the interaction of the media sheet to be processed with the media path and allows for determining the uniformity of the media sheet to be processed by tracking the min, max, and range variables listed in FIG. 9. At block B40, calculation of variables values using the collected intrinsic media variables data and extrinsic process variables data occurs to create respective intrinsic and extrinsic variables data sets. At block B45, the intrinsic and extrinsic variables data sets are normalized. At block B50, the media determining equation set is solved for a determined media class using the normalized intrinsic and extrinsic variables data sets.

At block B55, an operating parameter for a media process device MPD is selected using the determined media class and, at block B60, the media sheet is fed to the MPD for processing. At block B65, method M1 ends. The selected operating parameter of imaging device 2 to be adjusted may be one of: a process speed within the print engine 4, a duplex control scheme, a fuser temperature, a transfer voltage, an output location and a finishing process such as stapling or hole punching. The top speeds of a print engine are designed to support common media weights such as twenty pound media. For thicker/heavier media, the controller 3 would slow the media speed to ensure that the media can be picked, fed and fused. A slower media speed increases the residence time in the fuser 93 providing a higher amount of energy needed to fuse toner to the heavier weight media classes. Fusing temperature is dependent on media thickness. The heavier the media, the more energy is needed to ensure proper fusing of toner to it. If the imaging device 2 cannot maintain a fusing temperature due to the available line voltage, controller 3 may increase fuser temperature and/or reduce media speed to ensure proper fusing as media weight increases. The transfer voltage refers to the voltage needed to transfer the toned image onto the media sheet. For a media class of a heavier weight, a higher transfer voltage may be needed. For a given media class, the controller 3 can either increase or decrease the transfer voltage and/or increase or decrease process speed to ensure proper toner transfer to the media sheets in that media class. The duplex control scheme may be selected based on media class where the controller 3 may elect not to send a sheet of a heavier weight media class through a duplex path because turn radii in the duplex path may not be optimized for the heavier media class. Media class may also determine the choice of output location and/or finishing options that would be available in that heavier media may not be able to be sent to a given output location due to small radius turns in the media path or that the number of sheets of heavier media classes may need to be limited as compared to the number of sheet of lighter weight media classes when undergoing stapling and hole punching. When finishing lighter weight media classes, stapling force and/or hole punch force may need to be decreased.

Figure 16:
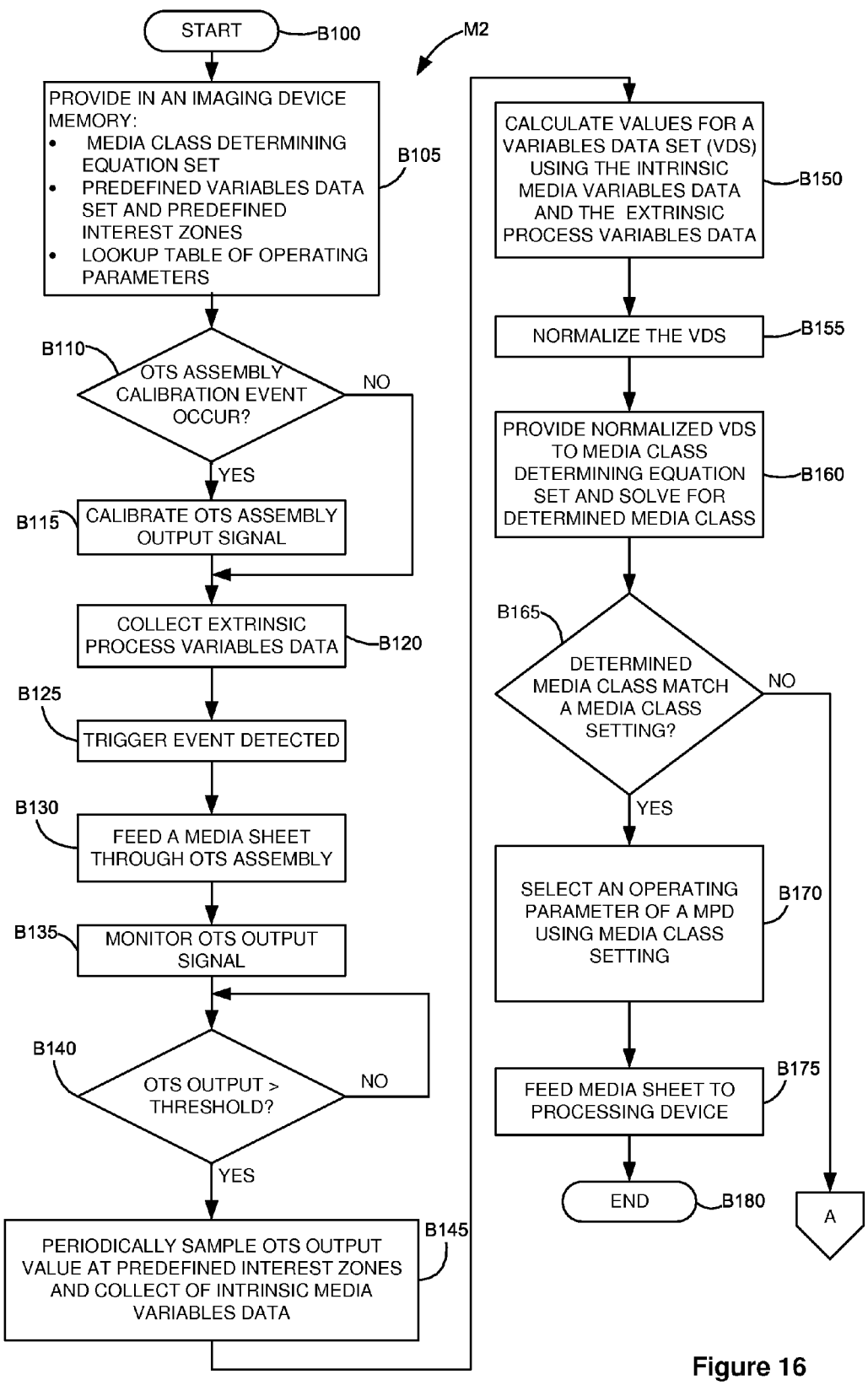
FIGS. 16-17 are a flow chart of another example embodiment of the present method for determining a media class in an imaging device.
Figure 17:
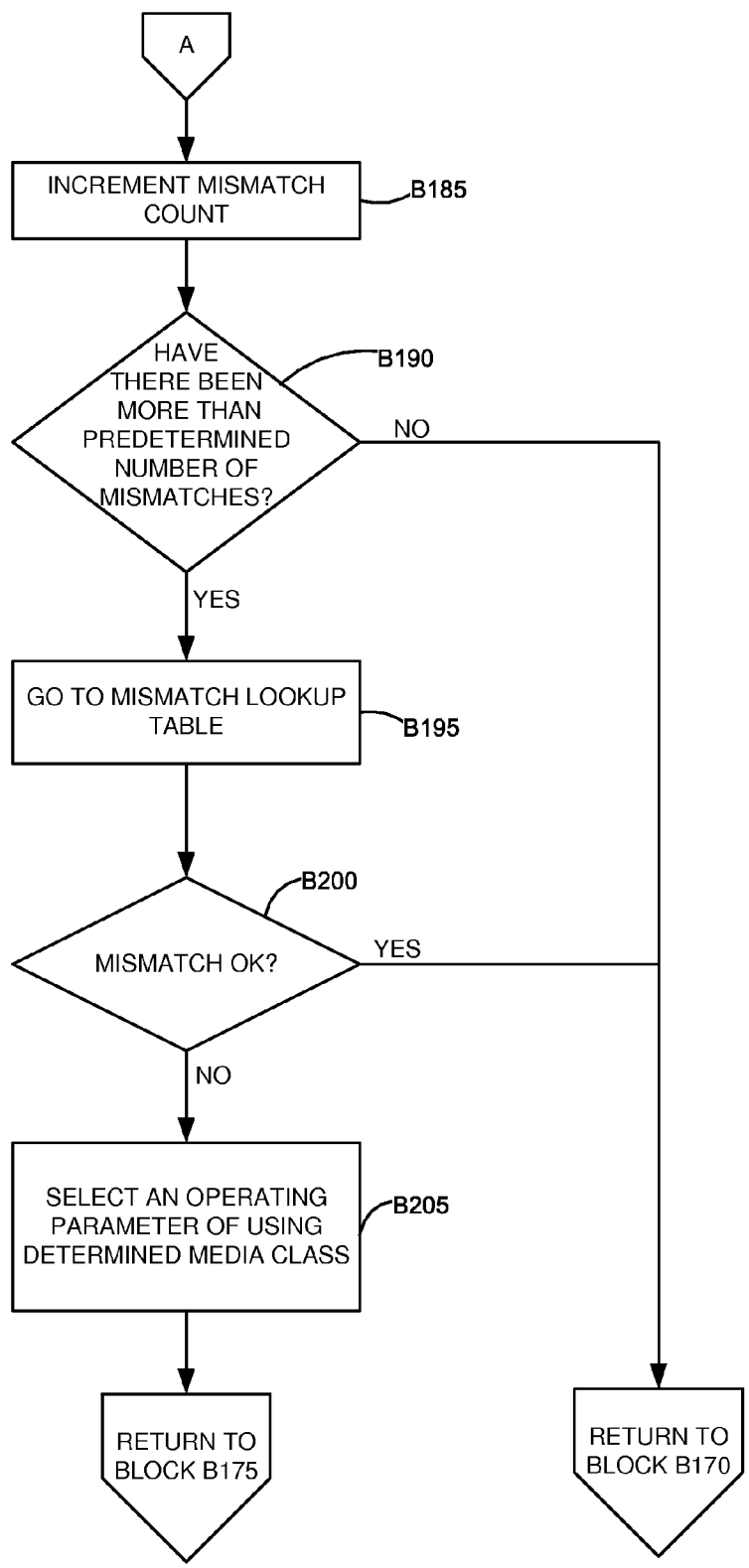

FIGS. 16-17 present another example method M2 for determining a media class for a media sheet using the OTS assembly 200 and then processing the media sheet in a media processing device of the imaging device 2. Process M2 starts at block B100 and proceeds to block B105 where the media class determining equation set, predefined variables data set, such as those listed in FIG. 9, and predefined interest zones, such as interest zones Z1-Z4, and a lookup table of operating parameters are stored in the memory 11 of imaging device 2. Continuing to block B110, a determination is made whether or not an OTS assembly calibration event has occurred. When it is determined that a calibration event, such as a power on reset, or the passage of a predetermined time period or number of media sheets, etc., has occurred, at block B115, the OTS assembly 200 output signal is calibrated as previously described. Thereafter method M2 proceeds to block B120. When it is determined that a calibration event has not occurred, method M2 proceeds to block B120. At block B120, the extrinsic process variables data are collected. At block B125, a trigger event is detected, and, at block B130, a media sheet to be processed is fed through the OTS assembly 200. At block B135, the output signal of the OTS assembly 200 is monitored. At block B140, a determination is made whether or not the OTS assembly 200 output signal is greater than a predetermined threshold. When it is determined that the output signal of the OTS assembly is not greater than a threshold value, method M2 loops back to block B140. When it is determined that the output signal of OTS assembly 200 is greater than the threshold, then at block B145, the OTS assembly 200 output signal is periodically sampled at the predefined interest zones and the intrinsic media variables data is collected and/or calculated. It will be recognized that this looping may be limited in number or in time as is known in the art.

At block B150, calculation of values for a variables data set (VDS) using the intrinsic media variables data and the extrinsic process variables data is performed. Thereafter, at block B155, the VDS is normalized. At block B160, the media determining equation set is solved for a determined media class using the normalized VDS. At block B165, a determination is made whether or not the determined media class matches a media class setting. The media class setting may be a user entered setting or a default setting of imaging device 2. When it is determined that the determined media class matches the MPD media class setting, method M2 proceeds to block B170 where an operating parameter for the media process device MPD is selected using the MPD media class setting, and, at block B175, the media sheet is fed to the MPD for processing. At block B180, method M2 ends.

When it is determined that the determined media class does not match the MPD media class setting, method M2 proceeds to block B185 where a mismatch count is incremented. At block B190, a determination is made whether or not there have been more than a predetermined number of mismatches. When it is determined that there has not been more than a predetermined number of mismatches, method M2 returns to block B170 where an operating parameter for the media process device MPD is selected using the media class setting. When it is determined that there has been more than a predetermined number of mismatches, method M2 proceeds to block B195 to go to a mismatch lookup table. Thereafter, at block B200, a determination is made whether or not the mismatch is acceptable. An acceptable mismatch may occur when the media class setting and the determined media class are similar. For example, a mismatch between a determined media class of normal weight and a media class setting of heavy weight media may be acceptable whereas a mismatch between a determined media class of normal weight media and a media class setting of a transparency would not. The list of acceptable and unacceptable mismatches is a matter of design choice. When it is determined that the mismatch is acceptable, method M2 returns to block B170 where an operating parameter for the media process device MPD is selected using the media class setting. When it is determined that the mismatch is unacceptable, method M2 proceeds to block B205 where an operating parameter for the MPD is selected using the determined media class. Thereafter, method M2 returns to block B175 for the processing of the media sheet.

The foregoing description of embodiments has been presented for purposes of illustration. It is not intended to be exhaustive or to limit the present disclosure to the precise steps or their illustrated order and/or forms disclosed. Obviously many modifications and variations are possible in light of the above teaching. It is intended that the scope of the invention be defined by the claims appended hereto.

What is claimed is:

1. In an imaging device using a media set having a predetermined number of media classes, the imaging device including a media processing device, a plurality of media input sources, a media feeding system in communication with the media processing device and the plurality of media input sources, an optical translucence sensor (OTS) mounted on a media path between the plurality of media input sources and the media processing device, the imaging device operable at a plurality of media process rates, the media feeding system feeding a media sheet to the media processing device for processing thereat, the OTS having an output signal representative of the translucence of the media sheet, a method of determining a media class from media set for a media sheet to be processed by the media processing device in the imaging device, the method comprising:

storing in memory of the imaging device media class determining equation set incorporating a predetermined plurality of media class determining equations using a predetermined set of variables wherein each media class determining equation corresponds to one media class of the media set;

at a controller in the imaging device:

determining a selected media source from the plurality of media sources;

determining a process rate from the plurality of process rates;

forming an extrinsic variables data set including the selected media source and the determined process rate;

providing an indication that the media sheet to be processed is in position to enter the OTS;

passing the media sheet to be processed through the OTS;

measuring the output signal of the OTS at a plurality of predefined interest zones during the passage therethrough of the media sheet to be processed;

forming an intrinsic variables data set from the measurements of output signal of the OTS;

normalizing the intrinsic variables data set and the extrinsic variables data set;

solving the media class determining equation set using the normalized intrinsic and extrinsic variables data sets to determine for the media sheet to be processed a media class from the media set; and, selecting, based upon the determined media class, at least one operational parameter for the media processing device for processing the media sheet.

2. The method of claim 1 wherein the media set includes light weight media, normal weight media, heavy weight media, cardstock, and transparencies.

3. The method of claim 1 wherein the plurality interest zones include a first interest zone where the media sheet to be processed initially enters the OTS and the output signal of the OTS reaches an initial peak value, a second interest zone subsequent to the first interest zone where the output signal of OTS settles to a first steady state value, a third interest zone where the output signal of the OTS begins to increase in value from the first steady state value, and a fourth interest zone where the output signal of the OTS reaches a second steady state value.

4. The method of claim 3 wherein the measurements of the output signal of the OTS in the first interest zone includes an initial maximum value, in the second interest zone includes a first mean value, a first minimum value, a first early maximum value, and a first range value, in the third interest zone includes a second mean value, a second minimum value, a second maximum value and a second range value, and, in the fourth interest zone includes a third mean value, a third minimum value, a third maximum value and a third range value, and a first delta between the first mean and the initial maximum values, a second delta between the first mean and the second mean values, a third delta between the first mean and third mean values, and a fourth delta between the second mean and third mean values.

5. The method of claim 1 wherein, prior to passing the media sheet to be processed through the OTS, performing a calibration of the OTS sensor wherein, with no media sheet present therein, the output signal of the OTS is set to a predetermined value by adjusting an input current to the OTS.

6. The method of claim 1 wherein the at least one operating parameter is selected from a group of operating parameters consisting of: a media speed within the print engine, a duplex control scheme, a fuser temperature, a transfer voltage, an output location, and a finishing process.

7. In an imaging device using a media set having a predetermined number of media classes, the imaging device including a media processing device, a plurality of media input sources, a media feeding system in communication with the media processing device and the plurality of media input sources, an optical translucence sensor (OTS) mounted on a media path between the plurality of media input sources and the media processing device, a temperature sensor, and a relative humidity sensor, the imaging device operable at a plurality of predetermined media process rates, the media feeding system feeding a media sheet to the media processing device for processing thereat, the OTS having an output signal, a method of determining a media class from media set for a media sheet to be processed by the processing device in the imaging device, the method comprising:
  storing in memory of the imaging device a media class determining equation set incorporating a predetermined plurality of media class determining equations using a predetermined set of variables wherein each equation corresponds to one media class of the media set;
  measuring the temperature and relative humidity;
  calculating a moisture content value using the measured temperature and relative humidity values;
  determining a selected media source from the plurality of media sources;
  determining a process rate from the plurality of process rates;
  forming an extrinsic variables data set including the selected media source, the determined process rate, the calculated moisture content, the measured temperature, and the measured relative humidity;
  passing the media sheet to be processed by the media processing device through the OTS
  measuring the output signal of the OTS at a plurality of predefined interest zones during the passage therethrough of the media sheet to be processed;
  forming an intrinsic variables data set from the measurements of output signal of the OTS;
  normalizing the intrinsic variables and the extrinsic variables data sets;
  solving the media class determining equation set using the normalized intrinsic variables and extrinsic variables data sets to determine for the media sheet to be processed a media class from the media set; and,
  selecting, using a look up table and based upon the determined media class, at least one operational parameter for the media processing device for processing the media sheet.

8. The method of claim 7 wherein the media set includes light weight media, normal weight media, heavy weight media, cardstock, and transparencies.

9. The method of claim 8 wherein, prior to passing the media sheet to be processed through the OTS, performing a calibration of the OTS sensor wherein with no media sheet present therein, the output signal of the OTS is set to a predetermined value by adjusting an input current to the OTS.

10. The method of claim 8 wherein the at least one operating parameter is selected from a group of operating parameters consisting of: a media speed within the print engine, a duplex control scheme, a fuser temperature, a transfer voltage, an output location, and a finishing process.

11. The method of claim 7 wherein the plurality interest zones include a first interest zone where the media sheet to be processed initially enters the OTS and the output signal of the OTS reaches a peak value, a second interest zone subsequent to the first interest zone where the output signal of OTS settles to a first steady state value, a third interest zone where the output signal of the OTS begins to increase in value from the first steady state value, and a fourth interest zone where the output signal of the OTS reaches a second steady state value.

12. The method of claim 11 wherein the measurements of the output signal of the OTS in the first interest zone includes an initial maximum value, in the second interest zone includes a first mean value, a first minimum value, a first early maximum value, and a first range value, in the third interest zone includes a second mean value, a second minimum value, a second maximum value and a second range value, and, in the fourth interest zone includes a third mean value, a third minimum value, a third maximum value and a third range value, and a first delta between the first mean and the initial maximum values, a second delta between the first mean and the second mean values, a third delta between the first mean and third mean values, and a fourth delta between the second mean and third mean values.

13. In an imaging device using a media set having a predetermined number of media classes, the imaging device including a media processing device, a plurality of media input sources, a media feeding system in communication with the media processing device and the plurality of media input sources, an optical translucence sensor (OTS) mounted on a media path between the plurality of media input sources and the media processing device, a temperature sensor, and a relative humidity sensor, the imaging device operable at a plurality of media process rates, the media feeding system feeding a media sheet to the media processing device for processing thereat, the OTS having an output signal, a method of determining a media class from media set for the media sheet to be processed by the media processing device, the method comprising:
  storing in memory of the imaging device a media class determining equation set incorporating a predetermined plurality of media class determining equations using a predetermined set of variables wherein each equation corresponds to one media class of the media set;
  measuring the temperature and relative humidity;
  calculating a moisture content value using the measured temperature and relative humidity values;
  determining a selected media source from the plurality of media sources;
  determining a process rate from the plurality of process rates;
  forming an extrinsic variables data including the selected media source, the determined process rate, the calculated moisture content, the measured temperature, and the measured relative humidity;
  determining whether or not an OTS calibration event has occurred;
  upon determining that an OTS calibration event has occurred performing a calibration of the OTS wherein, with no media sheet to be processed present therein, the output signal of the OTS is set to a predetermined value by adjusting an input current to the OTS;
  feeding the media sheet to be processed into a nip formed between a pair of feed rolls positioned along the media path prior to the OTS;
  on the occurrence of a trigger event, feeding the media sheet to be processed through the OTS;
  determining whether or not the OTS output signal is greater than a predetermined threshold value
  upon determining that the OTS output signal is not above the predetermined threshold value then repeating the action of determining whether or not the OTS output signal value is greater than the predetermined threshold value;

upon determining that the OTS output signal is above the predetermined threshold value periodically measuring the OTS output signal value at a plurality of predefined interest zones as the media sheet to be processed is feed from the nip through the OTS forming an intrinsic variables data;

forming a variables data set from the extrinsic process variables data and the intrinsic media variables data;

normalizing the variables data set;

solving the media class determining equation set using the normalized variables data set to determine for the media sheet to be processed a media class from the media set;

determining whether or not the determined media class matches a selected media class setting for the media processing device;

upon determining that the determined media class matches the selected media class setting:
   selecting, based upon the selected media class setting, at least one operational parameter for the media processing device for processing the media sheet to be processed; and,
   feeding the media sheet to be processed to the media processing device;
and, upon determining that the determined media class does not match the selected media class setting:
   incrementing a mismatch count for the selected media class setting;
   determining whether or not there have been more than a predetermined number of mismatches;
   upon determining that the number of mismatches does not exceed the predetermined number of mismatches then repeating the actions of selecting based on the selected media class setting at least one operational parameter for the media processing device for processing the media sheet to be processed; and feeding the media sheet to be processed to the media processing device;
   and,
   upon determining that the number of mismatches does exceed the predetermined number of mismatches:
      using a mismatch look up table to determine whether or not mismatch is acceptable;
      upon determining that the mismatch is acceptable:
         repeating the actions of selecting based on the selected media class setting at least one operational parameter for the media processing device for processing the media sheet to be processed and feeding the media sheet to be processed to the media processing device;
      and,
      upon determining that the mismatch is not acceptable:
         selecting based on the determined media class, at least one operational parameter for the media processing device for processing the media sheet to be processed and feeding the media sheet to be processed to the media processing device.

14. The method of claim 13 wherein the media set includes light weight media, normal weight media, heavy weight media, cardstock, and transparencies.

15. The method of claim 13 wherein the plurality interest zones include a first interest zone where the media sheet to be processed initially enters the OTS and the output signal of the OTS reaches a peak value, a second interest zone subsequent to the first interest zone where the output signal of OTS settles to a first steady state value, a third interest zone where the output signal of the OTS begins to increase in value from the first steady state value, and a fourth interest zone where the output signal of the OTS reaches a second steady state value.

16. The method of claim 15 wherein the measurements of the output signal of the OTS in the first interest zone includes an initial maximum value, in the second interest zone includes a first mean value, a first minimum value, a first early maximum value, and a first range value, in the third interest zone includes a second mean value, a second minimum value, a second maximum value and a second range value, and, in the fourth interest zone includes a third mean value, a third minimum value, a third maximum value and a third range value, and a first delta between the first mean and the initial maximum values, a second delta between the first mean and the second mean values, a third delta between the first mean and third mean values, and a fourth delta between the second mean and third mean values.

17. The method of claim 13 wherein the at least one operating parameter is selected from a group of operating parameters consisting of: a media speed within the print engine, a duplex control scheme, a fuser temperature, a transfer voltage, an output location, and a finishing process.

* * * * *